United States Patent [19]
Chahroudi

[11] Patent Number: 5,524,381
[45] Date of Patent: Jun. 11, 1996

[54] SOLAR HEATED BUILDING DESIGNS FOR CLOUDY WINTERS

[76] Inventor: Day Chahroudi, P.O. Box 497, Placitas, N.M. 87043

[21] Appl. No.: 888,230

[22] Filed: May 26, 1992

Related U.S. Application Data

[63] Continuation-in-part of Ser. No. 670,783, Mar. 19, 1991.

[51] Int. Cl.$^6$ .................................................... A01G 9/00
[52] U.S. Cl. .................. 47/17; 52/1; 52/173.3; 126/622; 126/572; 126/635; 126/643
[58] Field of Search ............................. 47/17 SC, 17 RM; 52/173.3, 1; 126/419, 422

[56] References Cited

U.S. PATENT DOCUMENTS

| | | | |
|---|---|---|---|
| 4,141,498 | 2/1979 | Marschner | 47/17 EC |
| 4,215,672 | 8/1980 | Chiapale | 47/17 SC |
| 4,260,225 | 4/1981 | Walles | 350/353 |
| 4,268,126 | 5/1981 | Mumford | 52/171.3 |
| 4,291,674 | 9/1981 | Comte | 47/17 SC |
| 4,446,850 | 5/1984 | Zilisch | 47/17 SC |
| 4,462,390 | 7/1984 | Holdridge | 52/82 |
| 4,527,544 | 7/1985 | Wolf | 47/17 RM |
| 5,092,101 | 3/1992 | Kunert | 52/789 |

FOREIGN PATENT DOCUMENTS

| | | | |
|---|---|---|---|
| 2743984 | 4/1979 | Germany | 47/17 SC |
| 3913552 | 10/1990 | Germany | 47/17 SC |

*Primary Examiner*—Henry E. Raduazo
*Attorney, Agent, or Firm*—Willian Brinks Hofer Gilson & Lione

[57] ABSTRACT

A building including high efficiency transparent insulation and optical shutter solar collector (HETIOSSC) to effectively control heat loss and gain in a passively-solar climate control system. HETIOSSC includes a layer of protective glazing, a transparent insulation, an optical shutter, an optional solar radiation absorbing material and optional heat storage elements. When the building and its heat storage are too warm, the optical shutter layer becomes opaque to prevent overheating. During cloudy and cold winter days, HETIOSSC still has a solar transmission and insulation efficiency great enough to collect sufficient sunlight for heating. Location of HETIOSSC on the roof, rather than the walls, does not alter shape and orientation of a building.

26 Claims, 15 Drawing Sheets

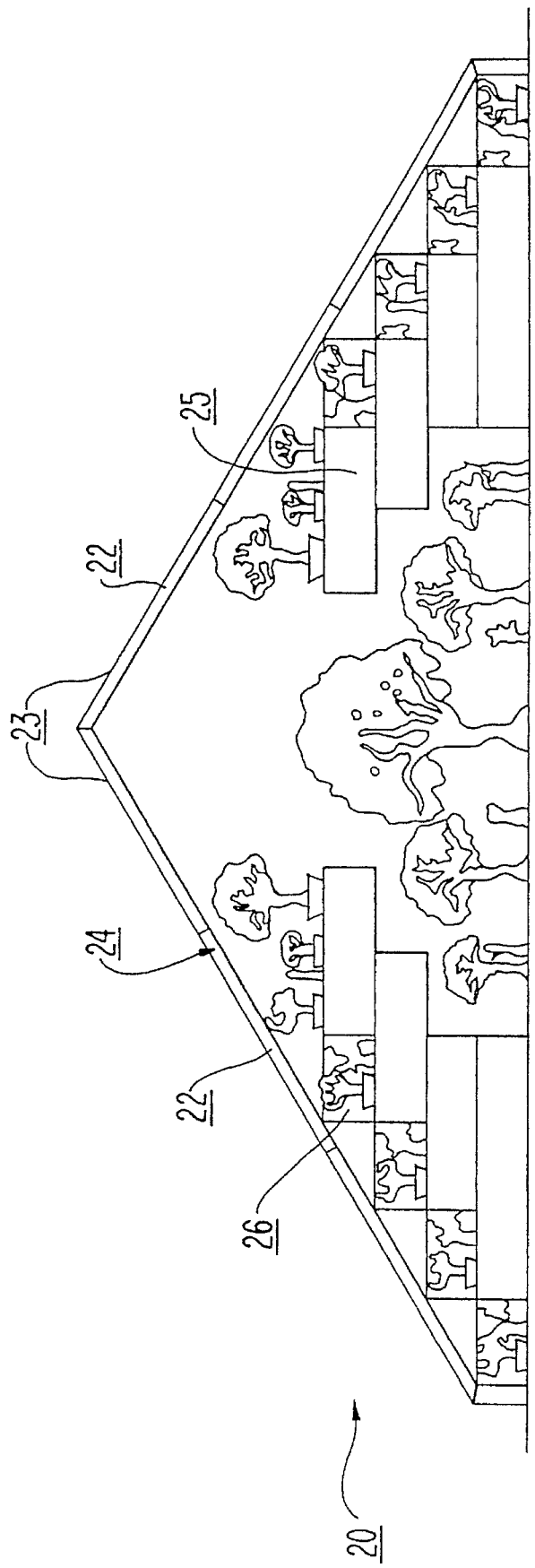

| NAME OF LAYER | LAYER NUMBER | REFERENCE NO. (FIG. 12A) | OUTSIDE* |
|---|---|---|---|
| GLAZING | 1 | 26 | ———— |
| SHUTTER | 2 | 36A | ———— |
| TRANSPARENT INSULATION | 3 | 30 | ———— |
| SHUTTER | 4 | 36B | ———— |
| ABSORBER | 5 | 40A | ———— |
| SHUTTER | 6 | 36C | ———— |
| HEAT STORAGE | 7 | 42 | ———— |
| SHUTTER | 8 | 36D | ———— |
| ABSORBER | 9 | 40B | ———— |
| INTERIOR FINISH | 10 | 54 | ———— |

* SCHEMATIC REPRESENTATION OF THE LAYERS.       INSIDE

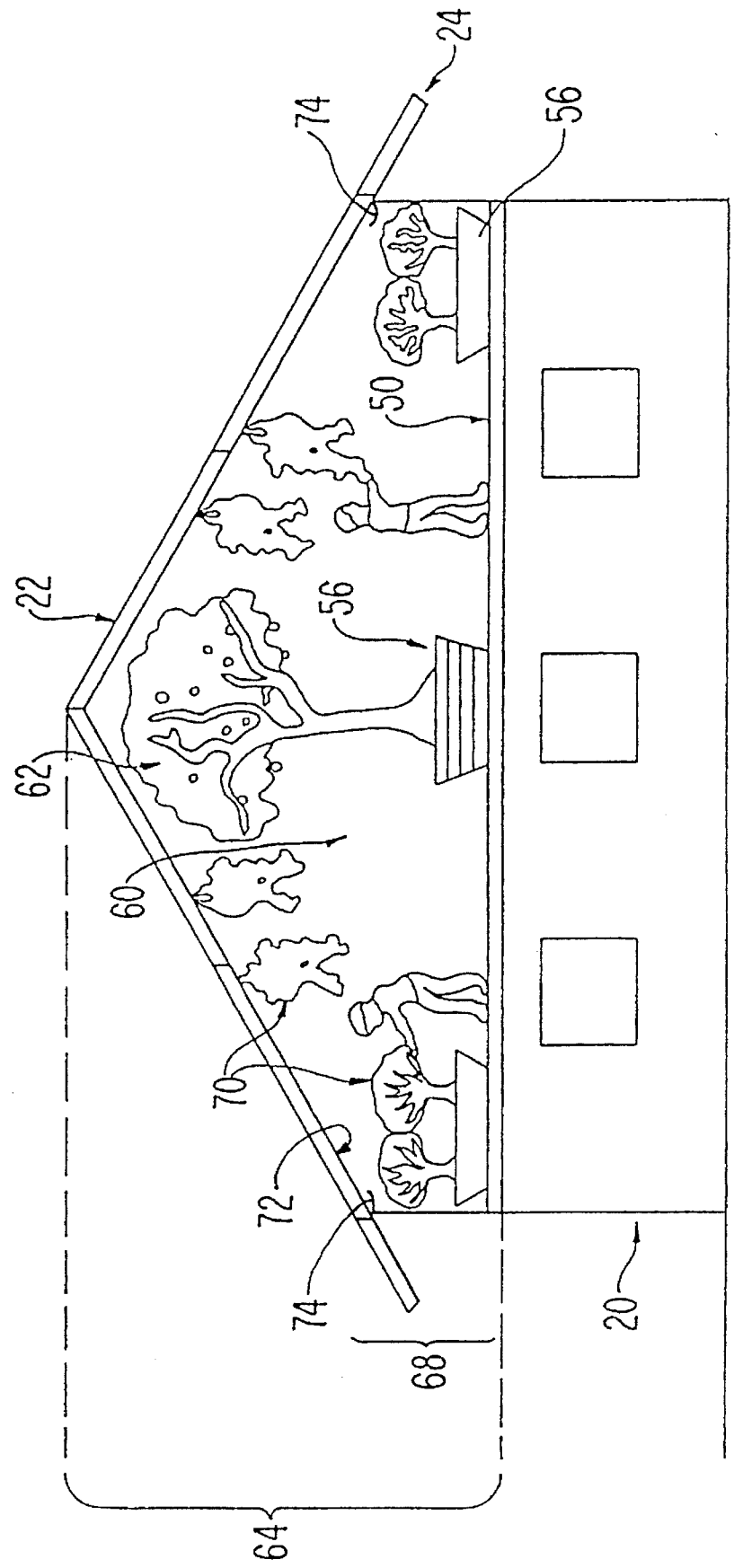

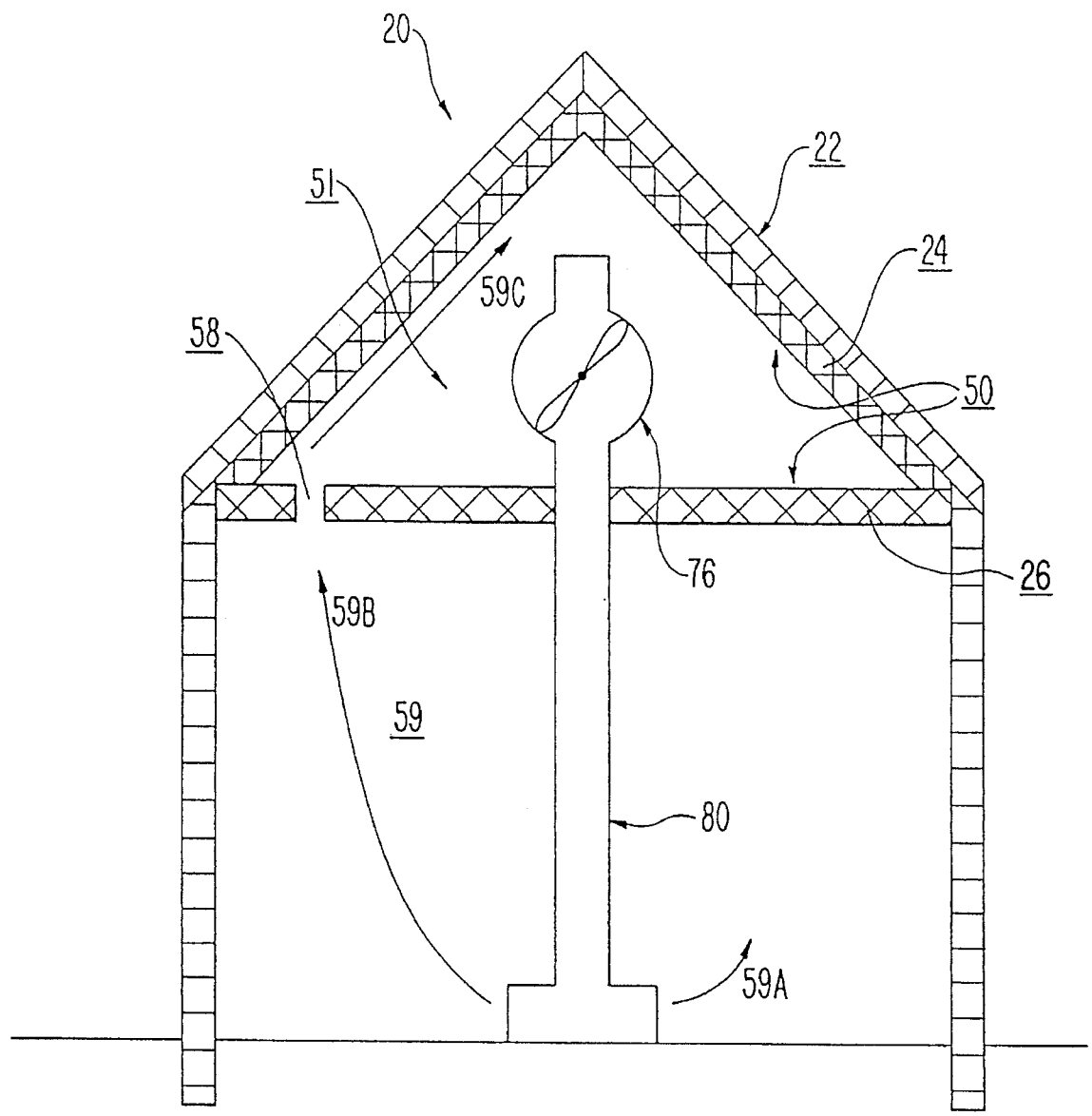

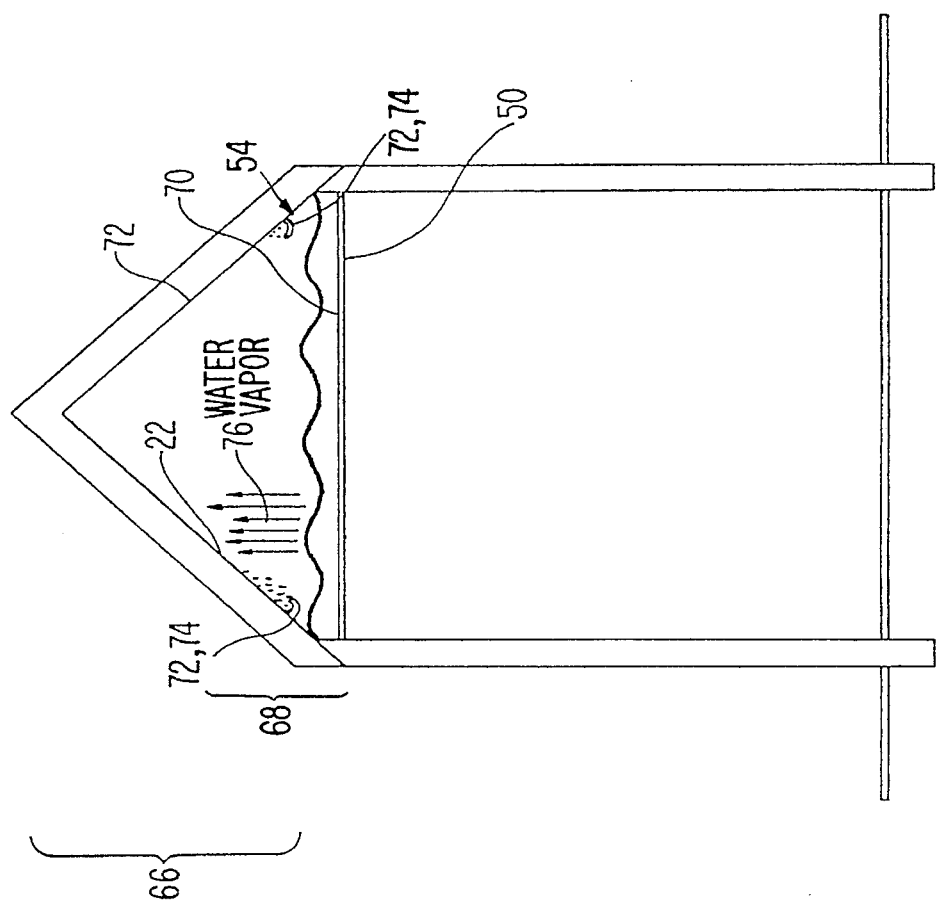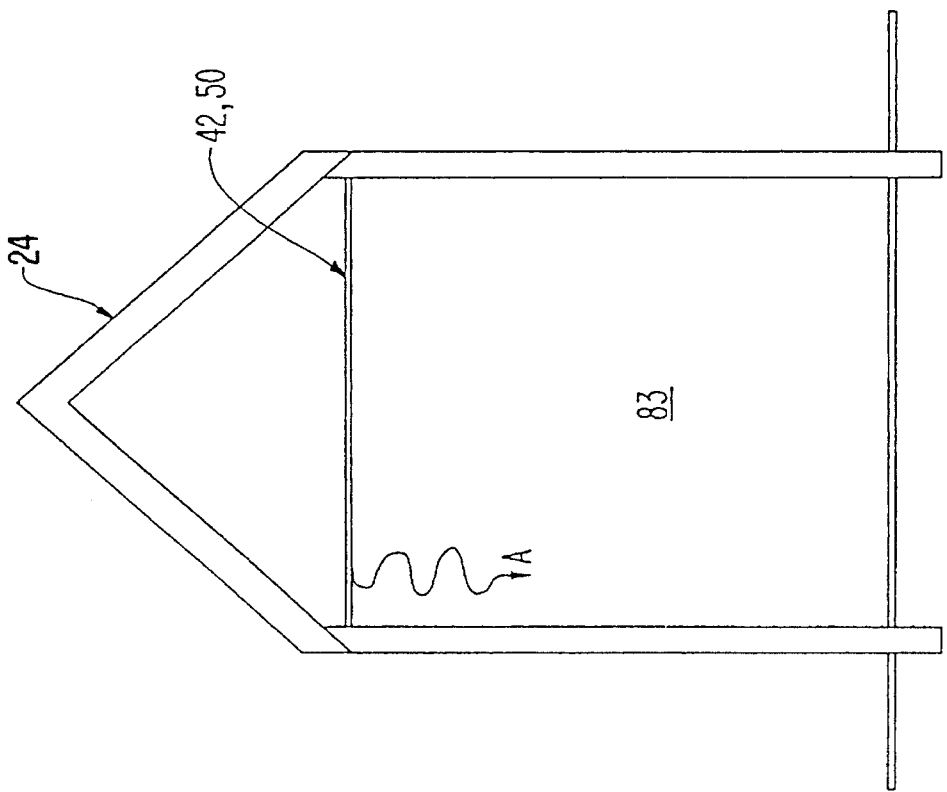

SOLAR HEATED BUILDING DESIGNS FOR CLOUDY WINTERS

CROSS-REFERENCE TO OTHER PERTINENT INFORMATION

This is a continuation-in-part of U.S. application, Ser. No. 07/670,783, filed on Mar. 19, 1991, copy attached, the entire contents of which are incorporated herein by reference.

REFERENCE TO OTHER PERTINENT INFORMATION

This application is also related by subject matter to a paper entitled "Weather Panel Development And Architecture," to be delivered by Day Chahroudi on May 26, 1992, at the Transparent Insulation Technology Conference given at Freiburg, Germany, sponsored by the Fraunhofer Institute; and to a disclosure entitled "Solar Heated Building Designs For Cloudy Winters," dated May 19, 1992, also authored by Day Chahroudi. Both, the aforementioned paper and the disclosure, are incorporated herein by reference in their entirety, and copies thereof are attached to this application.

BACKGROUND OF THE INVENTION

1. Field of the Invention

The present invention is directed to an improved design for solar-heated buildings. In particular, the present invention relates to improved designs for solar-heated buildings that offer improved ease of building design and construction, lower cost, and better performance over existing passive solar heating designs, particularly in climates with cloudy winters.

2. Discussion of Related Art

A number of known systems have been used to collect, hold and release solar energy. Existing solar collectors typically collect solar heat during one to ten days per month of sunny winter weather. These existing solar systems store the collected heat only on sunny days and release heat during cloudy weather. A large proportion of the world's population lives where winters are cloudy. Previously, solar architects have responded with a design strategy of collecting solar heat during the one to ten days per month of sunny winter weather, and then storing this heat and releasing it during cloudy weather. This design suffers from several disadvantages. For example, this design necessitates that a full size backup fossil fuel heater be used when heat storage gives out during the longest periods of cloudy weather. It requires a large thermal storage unit which is expensive and which can lose some of the heat it stores, and it requires a large solar collector area which faces the equator, the direction of the winter sun, and in addition is more expensive. The solar collector must occupy most of a south facing wall and/or roof, which places severe restrictions on the building's shape, orientation and appearance. The above restrictions make the design of a conventional solar heated building a highly skilled compromise between conflicting requirements of aesthetics, building shape, use and site limitations, cost, and solar efficiency. Solar space heating and daylighting have not yet fulfilled their promise because reconciliation of the conflicting requirements of solar efficiency, low cost, ease of construction, aesthetics, building shape and site is difficult and often impossible.

Various similar building designs for collecting and storing sunlight have been used in the past. Nevertheless, none of these known designs have provided an efficient means for incorporating the solar collector in a building without altering the aesthetics, shape, orientation or functionality of the structural design, or, alternatively, without sacrificing solar collection efficiency. The conventional solar heating systems require large thermal storage units, and large equator-facing solar collectors typically placed on south walls of buildings.

None of the previously known systems described above offers the important advantage of the ability to efficiently collect and store sunlight on cloudy days. Similarly, none of the above-described art locates solar collectors on the building's roof when the roof design is dictated by architectural rather than solar conditions; instead, solar collectors were located on the south walls or the roof of the building, thus requiring substantial modification of traditional building design and orientation.

SUMMARY OF THE INVENTION

It is an object of the present invention to maximize solar efficiency while eliminating the need for special building design plans or compromises on building aesthetics.

A further object of the present invention is to allow the substitution of roof elements or wall elements with solar collectors rather than to necessitate the addition to roof elements or wall elements, so that the cost of the roof is subtracted from the cost of the solar collector.

It is an additional object of the present invention to solve problems of location and orientation of solar collectors. Additional objects of the invention will become apparent to those skilled in the art from the following description thereof.

According to the present invention, a building is provided having a series of multi-layered solar collectors incorporated into the building's roof. Each multi-layered solar collector comprises a layer of a transparent glazing material at the outermost surface of the multi-layered solar collector; a layer of a transparent insulation material; a layer of optical shutter; and a heat storage element. If the optical shutter becomes opaque by absorbing sunlight, the optical shutter is positioned between and adjacent to the transparent glazing material and transparent insulation material. This insulates the heat generated by the shutter's absorption when that heat is not wanted. In this embodiment, the heat storage element is placed after the layer of the transparent insulation material, with respect to the direction of travel of the incident sunlight. If the optical shutter rejects sunlight by reflection it is utilized as a reflecting means. In this case, the optical shutter is either positioned between and adjacent to the transparent insulation material and in heat transfer relationship to the heat storage element or is placed between the glazing and the transparent insulation material. Alternatively, if the optical shutter is used as a reflecting means, the heat storage element may be replaced by a solar absorbing material. The term "heat transfer relationship" means that the heat storage element is placed in sufficient thermal contact to an element with which it is in such a relationship to transfer heat to that element. The heat may be transferred to the element by any suitable means, such as by convection, conduction or forced heat transfer, e.g., fans moving heated air throughout the building. The term "element" means any object within the building which is capable of absorbing heat, such as sheet rock, articles of furniture, potted plants, or any structural components of the building, such as interior brick walls or collection of stones.

Depending on climate, the multi-layered solar collector will be incorporated into the majority of a building's roof.

Necessarily, the thermal conductivity of the transparent insulation material is less than 0.3 Btu/sq.ft./°F./hr., and an additional layer comprising a solar radiation absorbing material with an absorption of greater than 70% of the solar energy spectrum is placed where it will absorb sunlight admitted by the optical shutter and transparent insulation. Also to meet terms of this invention, the optical shutter must transmit at least three times more solar radiation energy in its transparent state than in its opaque state.

The solar collectors utilized herein are preferably high efficiency transparent insulation and optical shutter solar collectors (HETIOSSC). Such solar collectors have optical shutters which, become opaque to prevent overheating of the panel. During cloudy and winter days, the HETIOSSC has sufficiently high solar transmission efficiency to collect sufficient solar thermal energy for heating the building on top of which they are placed.

As pointed out in greater detail below, the placement of the solar collector in the building's roof provides important advantages over the prior art. For example, by locating the solar collectors in the roof rather than in the side walls, the orientation and shape of the building do not dictate the building's solar performance. This greatly reduces the skill required to design an efficient solar heated building.

If placed incorrectly, these HETIOSSC merely turn into opaque insulating panels, thus design mistakes are not important. A further advantage of the present invention is that this design acts to substitute for conventional roof elements rather than adding to existing roof structure, thereby allowing the cost of a conventional roof to be subtracted from the cost of the solar collectors. Yet a further advantage of the present invention is that the insulation value and cost of implementing the present design are comparable (but not necessarily equal) to conventional roof construction so that parts of the roof may be replaced without great additional cost or nighttime heat loss. Accordingly, the need for a large overnight backup fossil fuel (or other non-solar heating system) is obviated.

Yet another advantage of the present invention is the increased efficiency of collecting the comparatively dim and diffuse solar energy available during cloudy weather, even during the cold winter temperatures of northern latitudes, and that these solar collectors have both solar transmission and insulating value great enough to collect heat during cloudy weather.

The invention itself, together with further objects and attendant advantages, will best be understood by reference to the following detailed description taken in conjunction with the accompanying drawings.

BRIEF DESCRIPTION OF THE DRAWINGS

FIG. 2 shows a cross-section of a building with the roof and solar collector indicated;

FIG. 13 shows schematically several additional variations and placement of the heat storage element and possible location of evaporators and condensers of water;

FIG. 14 shows schematically an example of transferring heat by means of air circulated by fans through ducts;

FIG. 17 shows schematically the manner of transferring heat from heat storage elements contained in the floor below the roof to the remainder of the building's interior by means of thermal radiation;

FIG. 18 shows schematically placement and operation of a solar still;

DETAILED DESCRIPTION OF THE INVENTION

Figure 1:
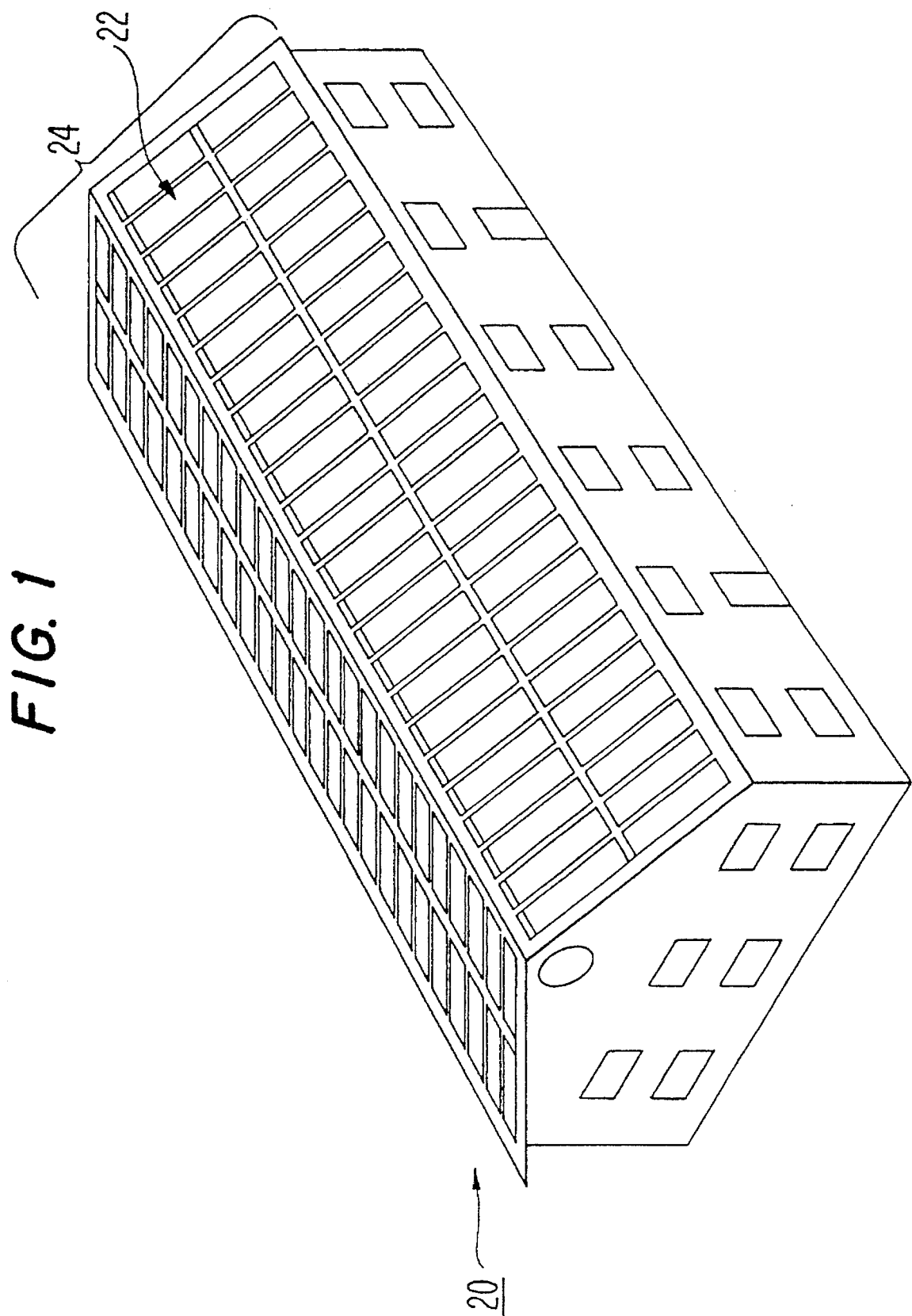
FIG. 1 shows a building which incorporates a solar collector into the building's roof.

Turning now to the drawings, FIG. 1 shows a building 20 which incorporates a solar collector 22 into the building's roof 24. This building's 20 design involves minimal adverse aesthetic or financial impact, and this particular example is a dwelling of four 1500 sq. ft. apartments. The pitch of the roof 24 is 30 degrees, the minimum angle at which snow will slide off. The roof 24 is made entirely from solar collectors 22, except for a fringe made of a traditional roof material. In its transparent state, a solar collector 22 transmits diffuse solar radiation (more precisely, hemispherical solar spectrum transmission) at a rate of more than 30%. Any solar collector/building configuration (the absorber and heat storage may be part of the building and not the collector, see FIG. 13) which are capable of: solar transmission ≧30%; the ratio of the optical shutter's maximum:minimum transmission ≧3:1; solar absorbance of ≧70% of the absorber; storage ≧70% of overnight heat usage on average day of coldest month can be used in this invention. Suitable solar collectors are abbreviated herein as high efficiency transparent insulation and optical shutter solar collectors (HETIOSSC). Preferred embodiments of the solar collectors made of such HETIOSSC are described in detail in a co-pending U.S. patent application Ser. No. 07/670,783, filed on Mar. 19, 1991 by Day Chahroudi, entitled "Light Admitting Thermal Insulating Structure," which application is attached hereto. For the sake of clarity, the term "convection baffle" in this application corresponds to the element identified as CBTLTR in the aforementioned '783 application. Briefly, the light admitting thermal insulating structure in that application comprises a light admitting thermal panel having improved thermal resistance which transmits light and solar radiation between the inside and outside of the panel, one or more transparent insulation layers (thermal radiation and convection suppressing materials) near the outside surface of the panel, and an optical shutter layer and optional solar radiation absorbing layer near the inside of the building. These HETIOSSC are designed to be placed on or form the roof or walls of the building to be heated.

The convection baffle is a structure designed to divide a gas filled cavity into compartments, and to thereby suppress convective heat transfer by the gas inside the cavity. The convection baffle, when used with a transparent low emissivity layer, can be made from thin sheets or films of a sunlight and thermal radiation transparent material. These baffle surfaces may be constructed from a polyolefin, preferably of very high crystallinity polyethylene, or very low crystallinity polyethylene.

The low emissivity layers are layers that either transmit or absorb light. These layers may include one or more coatings or layers of material which reflect and do not emit thermal radiation to prevent its transmission. They may be transparent or may absorb light. These layers are described further, infra.

The optical shutter is a layer which regulates light transmission, thereby preventing the flow of heat in the form of sunlight.

A shutter may be reversibly activated by local temperature (thermochromic), incident light intensity (photochromic), an electric current or field (electrochromic) or both local temperature and incident light intensity (thermophotochromic).

The optical shutter allows regulation of the desired solar heat, and thus the temperature for the area in which solar energy is to be directed or diverted.

U.S. Pat. No. 4,085,999, issued on Apr. 25, 1978 to Day Chahroudi, entitled "Transparent Thermal Insulating System," and U.S. Pat. No. 4,307,942, issued on Dec. 29, 1981 to Day Chahroudi, entitled "Solar Control System," U.S. patent application Ser. No. 06/948,039, filed on Dec. 21, 1986, entitled "Structure And Preparation Of Automatic Light Valves," and U.S. patent application Ser. No. 07/441, 907, filed on Nov. 28, 1989, entitled "Automatic Light Valves" are likewise incorporated herein by reference in their entirety; copies of the '039 and the '907 applications are attached hereto. U.S. Pat. No. 4,085,999 discloses some thermal insulating systems. U.S. Pat. No. 4,307,942 describes controlling the transmission of visible radiation as a function of temperature. The aforementioned U.S. patent applications '039 and '907 disclose some examples of optical shutters which can be used in solar collectors utilized in this invention.

In this invention (FIG. 1), the solar collectors 22 are placed on the roof 24 rather than on a vertical wall of the building, for maximum solar heat collection, on cloudy days.

Turning now to FIG. 2, a cross-section of an alternate embodiment of the building 20 is shown with the roof 24 solar collector 22 indicated. As shown in FIG. 2, the building may be an inexpensive building, which may contain apartments or offices, for example. The roof 24 may be constructed at a 30 degree pitch or greater to allow snow to slide off. An insulation envelope 23 made from wide tunnel segments (not shown) of 200 feet (65 meters) may be used to limit span and snow buildup along the edges. The 65 foot (20 meters) height of the insulation envelope 23 facilitates summer cooling by catching wind and by the chimney effect. Included within the insulation envelope 23 of the building 20 is heat storage, consisting of anything interior to or contained within the opaque and transparent insulation of the building 20 and the ground it is built on. Thus, for example, a brick wall forming the outside surface finish (not shown) of the building would not be included, nor would the exterior transparent glazing of a skylight (not shown). Inside the sometimes translucent, sometimes transparent tunnel comprising the insulation envelope 23 are a few levels of rooms 25 which are stacked like bleachers. The ceilings above these rooms may be covered with gardens 26 which may be used to provide fresh food, water and air, and heat may be stored in the uninsulated structure of the rooms 25. A garden for the apartment above may be on the roof of the apartment below. This garden can be made private from next door gardens by trellis walls covered with plants or by shrubs. When this building design is not used for apartments, the roof gardens can be public, with the envelope moved a bit further from the rooms to make space for larger trees. Year round summer parks, gardens, athletic fields and swimming pools may be shaded by tall trees both between the rows of apartments, and where the envelope segments join or bend.

Figure 3A:
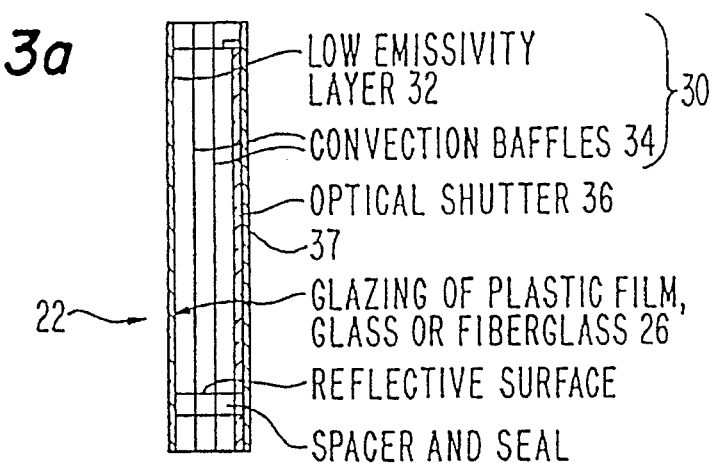
FIGS. 3A–3C show a cross-section of a solar collector using thermochromic shutter from the outdoor side (left) to the indoor side (right)
Figure 3B:
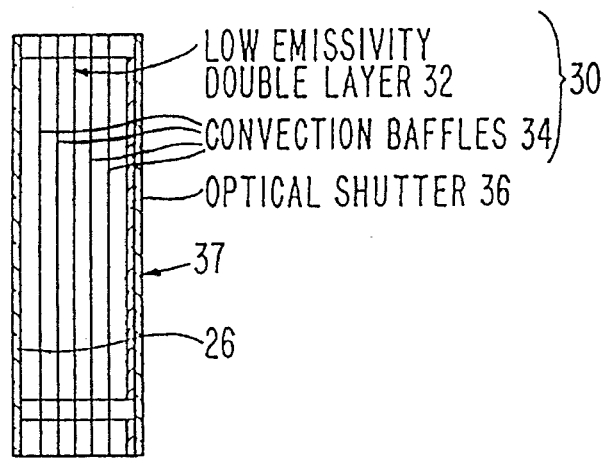
Figure 3C:
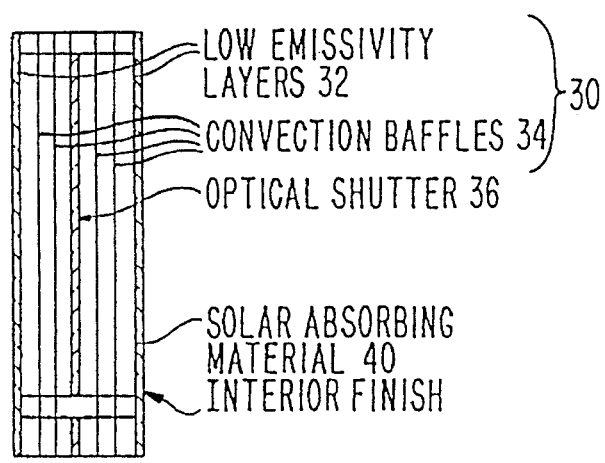
Figure 3D:
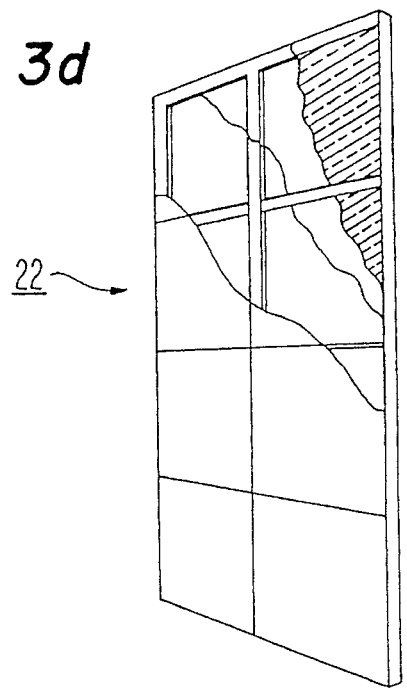
FIG. 3D shows a ¾ view of a possible panel configuration.

In FIGS. 3A–3C, there is schematically illustrated a cross-section of various embodiments of the HETIOSSC solar collector 22 made with low emissivity coatings, thermochromic shutter and convection baffles. In FIGS. 3A–3C, the layers are described in the direction from the outdoor side (left) to the indoor side (right). FIGS. 3A–3C show a layer of transparent glazing material 26, which is a material that transmits solar radiation, such as glass, plastic sheet or film or translucent fiberglass reinforced plastic. Adjacent to the transparent glazing material 26 is a layer of a transparent insulation material 30, which transmits solar radiation well but which does not transmit heat well, having a thermal conductivity less than 0.3 (BTU/ft$^2$/°F./hr.). As used herein, the term "adjacent" means substantially parallel to but not necessarily touching another layer. The transparent insulation material 30 can be comprised of one or more low emissivity layers 32 and one or more layers 34 which perform the function of suppressing convection heat transfer, yet are transparent to solar radiation, as do low emissivity coatings and baffles, honeycombs, aerogels, and vacuum containing low emissivity coated windows. Suitable materials for the layer or layers 34 are convection baffles 34 or honeycomb structures, evacuated windows, aerogels and multiple panes of anti-reflected plastic film or glass. The low emissivity layer or layers 32 are comprised of any material which transmits solar radiation while reflecting thermal radiation, for example, $In_2O_3/Ag/In_2O_3$, or other dielectric/ metal/dielectric stacks made by vacuum coating or indium or tin oxide layers made pyrolytically. Next to the layers 34, there is a layer 36, which performs the function of optical shutter. The layer 36 is suitably made from a reflecting or absorbing optical shutter which is activated by voltage, current, heat or light. Next to the layer 36, there is a layer 37

(not shown separately) which performs the function of structural surface (protective layer) of the collector; it may be absorbing or transparent. The layer 37 can be made from any solid material, such as metal, plastic, glass, plastic film or fiber reinforcement plastic. The function of the layer 37 is to provide mechanical rigidity and protection to the collector and, optionally, to store heat.

FIGS. 3B and 3C illustrate alternative embodiments of the solar collector, which include four layers 34 (convection baffles). In these alternative embodiments, the solar panel is the HETIOSSC solar collector identified above.

The transparent insulation material 30 has insulating values equal to one to two inches of plastic foam, which is comparable (but not necessarily equal) to the insulating value of a typical roof and wall construction. At the same time, such a high performance transparent insulation material transmits from 30% to 70% of incident solar energy.

FIGS. 7 through 11 exemplify the incorporation of various types of transparent insulation components in solar collector 22. In FIGS. 3A, 3B and 3C, the low emissivity layer 32 is a material which does not emit much (i.e., less than 25%) of room temperature thermal radiation in the wavelength range of 3 to 40 microns. The low emissivity layer 32 may be transparent and composed, for example of a thin silver layer which is anti-reflected (i.e., reflects less solar radiation) by two dielectric layers on each side, or a layer of indium/tin oxide. The low emissivity layer 32 may be absorbing of solar radiation and be composed, for example, of a layer of nickel suboxide atop a layer of aluminum. If the low emissivity layers is absorbing, it is placed within the collector 22 and between the convection baffle 34 and the interior of the building 20. The convection baffle is preferably a layer of a material which absorbs less than 25% of thermal radiation between 3 and 40 microns wavelength. An example of a suitable material used for the convection baffle 34 is a 0.001 inch thick polyethylene film. The convection baffles 34 double the thermal resistance of a solar collector 22 (as compared to one without convection baffles) and they are inexpensive. If the aforementioned polyethylene material is used as the convection baffle it, unlike most plastics, is 90% transparent to long-wave infrared radiation between 3 and 40 microns wavelength, and it is extremely transparent to sunlight and can endure the sun's ultraviolet rays for 30 years. If the convection baffles 34 absorb too much radiation, they would undermine the effectiveness of the low emissivity layer 32. The use of convection baffles 34 can double the insulating value of a low emissivity layer 32 but represents a fraction of the cost of a second low emissivity layer 32. FIGS. 3A–3C show how a transparent insulation may be installed in a solar collector 22. Adjacent to and on either side of the transparent insulation material 30 is a layer comprising an optical shutter 36 which includes a material or device with controlled reversibly variable transmission of solar radiation and which transmits three or more times as much solar radiation energy in its transparent state as in its opaque state. Solar energy transmission through the optical shutter 36 may be controlled by temperature (i.e., see FIG. 5), by electrical means such as current or voltage, or by mechanical action, for example, and may block solar radiation through reflection or absorbance. The optical shutter's 36 placement will depend on whether the optical shutter 36 in FIG. 12 is functioning as a reflective or absorbing means.

Figure 4:
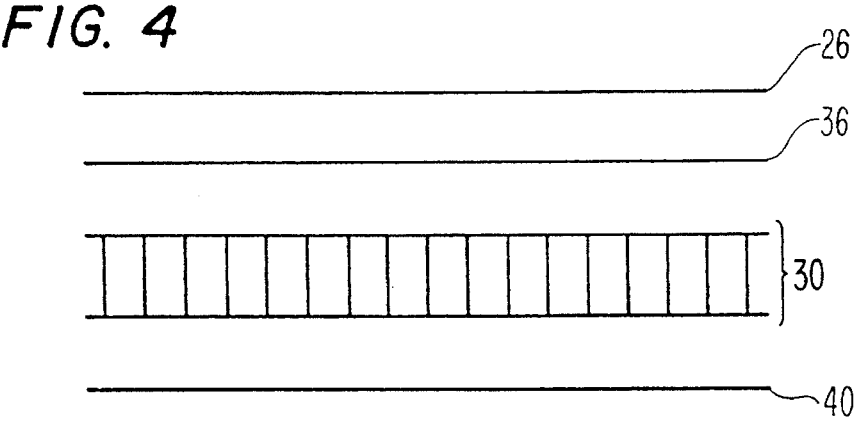
FIG. 4 shows schematically the relative positioning in a solar collector of the layer of transparent glazing material adjacent to the layer of absorbing optical shutter.

When it is the absorbing type of shutter, the optical shutter 36 is positioned between and adjacent to both the transparent glazing material 26 and the transparent insulation material 30 (See FIG. 4). When utilized as a reflecting means, the optical shutter 36 is positioned either adjacent to transparent insulation material 30 or the optional heat storage elements 42 or, if present, an optional layer of solar absorbing material 40 (as shown in FIG. 12).

FIG. 3C illustrates yet another alternative embodiment of the solar collector using a low emissivity type transparent insulation, which also incudes seven layers separated from each other. This solar collector may also include a layer of a solar absorbing material 40. This solar absorbing material 40 includes, for example, dark paint to absorb radiation and to match the building's 20 exterior and, for example, an interior finish of a layer of wallpaper, plaster or wood which gives the interior of a building 20 a pleasing appearance and/or is easy to clean.

By way of example, the relative thermal conductivity and solar transmission of the three exemplary solar collectors in FIGS. 3A–3C may be as follows:

TABLE

| FIGURE | 3A | 3B | 3C |
|---|---|---|---|
| THERMAL CONDUCTIVITY WATT/M$^{2\circ}$C. | 1.1 | 0.57 | 0.57 |
| BTU/FT$^{2\circ}$F. | 0.20 | 0.10 | 0.10 |
| TRANSMISSION SOLAR % | 70–7 | 50–5 | 50–5 |

Solar transmissions and thermal resistances in the above Table were calculated using the Window 3.1 program from USDOE Lawrence Berkeley Laboratory. Most of these values were also measured by the Fraunhofer Institute in Freiburg, Germany; ISFH in Hanover, Germany; and BBRI in Brussels, Belgium. The measurements confirmed the computer model in every case. The high values listed above for solar transmission of the solar collector 22 in FIG. 3A suggest its use in a greenhouse. The high thermal insulation values above for the solar collector 22 in FIGS. 3B–3C suggest its use in collecting heat during cloudy days.

FIG. 4 shows greater cross-sectional detail of the relative positioning in a solar collector 22 of a layer of absorbing type optical shutter. A transparent glazing material 26 is adjacent to the layer of an absorbing optical shutter 36, which in turn is adjacent to the transparent insulation material 30, which, in this embodiment, is adjacent to the optional solar absorbing material 40. This figure illustrates a structural arrangement of various layers which are necessitated by using an optical shutter 36 which functions by absorbing means. When an optical shutter 36 becomes absorbing and heats up it must be insulated from the building's interior by transparent insulation 30. Thus, an absorbing-type optical shutter 36 should be located between the glazing 26 and the transparent insulation 30. If the optical shutter 36 is a reflecting type, it may be placed on either side of the transparent insulation 30.

Figure 5:
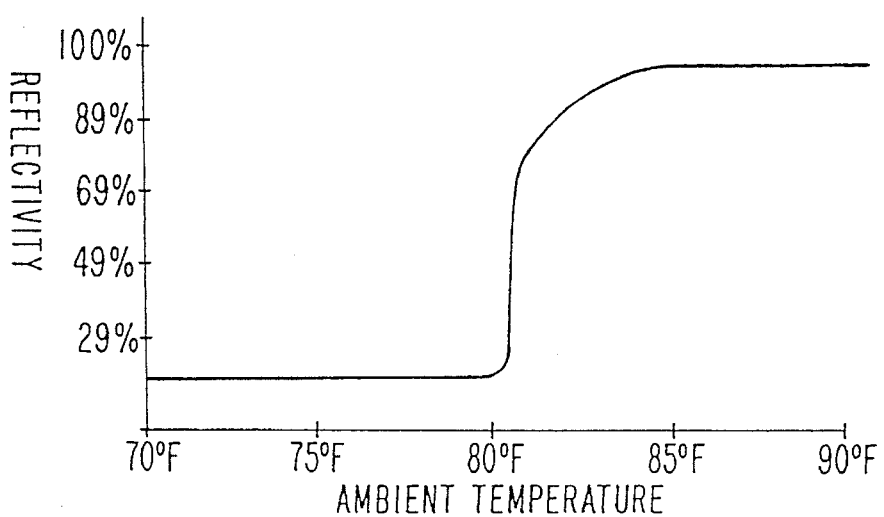
FIG. 5 shows a typical optical shutter reflectivity response to ambient temperature. This Figure shows how solar radiation reflection varies with changes in temperature.

As shown in FIG. 5, the thermochromic reflective type optical shutter's 36 reflectivity response to ambient temperature is plotted against the ambient temperature. This Figure shows how solar radiation reflection varies with changes in ambient temperature for a thermochromic reflective optical shutter of FIG. 6, located next to the building's interior or thermal storage in order to maintain constant the buildings interior or thermal storage temperature.

Figure 6:
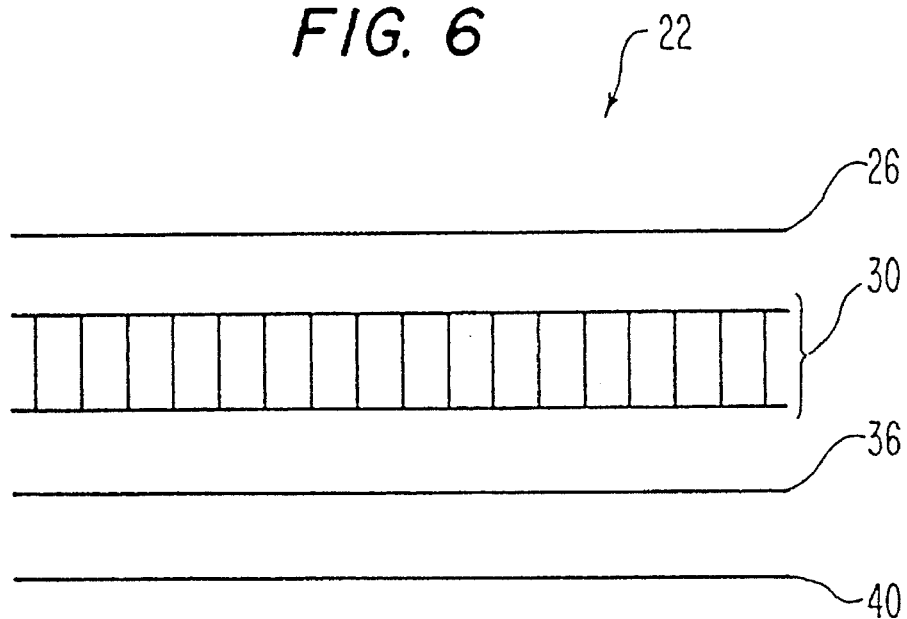
FIG. 6 shows schematically the relative positioning in a solar collector of the layer of thermochromic reflective optical shutter to the layer of transparent insulation material and the optional solar radiation absorbing material.

Variations on the embodiments described above are possible. For example, FIG. 6 shows a cross-sectional view of a solar collector 22. In FIG. 6, a layer of a transparent glazing material 26 is adjacent to a layer of transparent insulation material 30, which, in this embodiment, is adjacent to a layer of the reflecting optical shutter 36, which, in turn, is adjacent to the optional solar absorbing material 40. FIG. 6 also shows how a reflective optical shutter, such as Cloud Gel, may be installed in a solar collector 22. Cloud Gel is a thermochromic reflective optical shutter and it is a trademark of Suntek, Inc. Other materials may be used as a reflective optical shutter in the solar collector used herein. Cloud Gel is described in detail in co-pending U.S. patent applications Ser. No. 06/948,039, filed on Dec. 31, 1986 by Day Chahroudi, entitled "Building and Preparation of Automatic Light Valves," and Ser. No. 07/441,907 filed on Nov. 28, 1989, by Day Chahroudi, entitled "Automatic Light Valves," the entire contents of both of which are incorporated herein by reference. See also, "Thinking Window Switches Off the Sun When it is Hot," Popular Science, March 1984, and my article "Contractor Designed Passive Heating, Cooling, and Daylighting, . . "U.S. Passive Solar Conference (March 1990).

Briefly, Cloud Gel is a thermo-optical shutter layer consisting of a polymer and a solvent, where the polymer precipitates reversibly from the solution above its transition temperature, thereby reflecting light. The polymer and the solvent form separate phases which are finely divided. One of the phases is solvent rich, while the other phase is polymer rich.

The optical shutter 36 provides shading in the solar collector 22 to prevent overheating the building, as the temperatures in the collector can reach up to 400° F. without concentrating sunlight. Cloud Gel, a thermochromic optical shutter, reversibly turns an opaque white color and reflects up to 90% of the entire spectrum of light when heated above comfortable room temperature, and then returns to a clear state with 90% solar transmission when cooled. The transition temperature and the maximum reflectivity can be set during manufacture to create a variety of indoor climates for people and plants.

Merely by way of example, other types of optical shutters 36 can be activated by electronic current or voltage. These optical shutters 36 are categorized as electrochromic and can be controlled to have the properties of absorbing or reflecting solar radiation. The optical shutters can be controlled with electric voltage or current. FIG. 4 shows how an absorbing optical shutter 36 should be installed in a solar collector to avoid heating the building when it is absorbing. For example, a liquid crystal optical shutter has active ingredients of the same type as those chemicals that are known to be capable of creating digital displays in time pieces. For example, liquid crystals, sometimes in the form of droplets in a polymer matrix, are sandwiched between glass or plastic films, which are coated with a transparent conductor of electricity, such as an ultra-thin layer of indium/tin oxide that acts as an electrode. When a voltage is applied to the electrode, the liquid crystals align perpendicularly to the glass, and light passes through them. When the voltage is switched off, the liquid crystals scatter solar radiation, causing the optical shutter 36 to turn a translucent white.

Variations on the liquid crystal embodiment include an electrochromic glazing that has been likened to a transparent battery. This embodiment works by electronically altering the light-absorptive properties of a layer of electrochromic material (i.e., certain inorganic semiconductors called transition metal oxides, such as doped tungsten or vanadium oxides). These shutters also use two transparent electrodes. When a current is applied, ions from one layer and electrons from another migrate to yet a third layer - the electrochromic material. The resulting chemical reaction causes the glazing to absorb light and become dark (typically blue colored). To reverse this effect, the polarity of the electrodes is reversed.

In addition to the liquid crystal glazing and Cloud Gel optical shutters disclosed herein, other types of shutters, for example electrochromic shutters, are suitable. These materials act by electronically altering the light-absorptive properties of a layer of electrochromic material. Suitable electrochromic materials are certain inorganic semiconductors, for example, transition metal oxides, such as doped tungsten or vanadium oxides. Shutters utilizing these materials include two transparent electrodes. When a voltage is applied, ions from one layer and electrons from another layer migrate to yet a third layer—the electrochromic material. The resulting chemical reaction causes the glazing to absorb light and turn dark (typically bluish). To reverse the effect, the polarity of the two electrodes is reversed. Some of the companies developing electrochromic technologies are PPG, Pittsburgh, Pa.; SAGE Corp., Valley Cottage, N.Y.; the Solar Energy Research Institute, Golden, CO; and Lawrence Berkeley Laboratory, Berkeley, Calif.

Another type of electochromic optical shutter is a suspended particle optical shutter. Suspended particle optical shutters resemble liquid-crystal technology in that the active ingredients, for example, polyiodide crystals, change orientation in response to an applied voltage. Until recently, developers were using needle-like crystals suspended in a dense fluid and sandwiched between two sheets of glass, both again coated with a transparent conductive material. When a voltage is applied, the needles align perpendicularly to the walls, allowing the light to pass through. When the electricity is switched off the particles scatter and absorb light; then the glazing looks dark blue. One developer, Research Frontiers, Inc., Woodbury, N.Y., is working on a process that encapsulates particle-laden drops of liquid in plastic film. A convection baffle can be preferably added to the low emissivity coating of the solar collectors used herein.

When a shutter becomes absorbing in order to reject the heat of incoming solar radiation, the shutter itself heats up and must be insulated from the building's interior by the transparent insulation. Thus an absorbing type shutter should be located between the glazing and the transparent insulation as is shown in FIG. 4. If the optical shutter is the reflective type, it can be located on either side of the transparent insulation (see FIG. 12). In the event that the heat storage element is also transparent, then a reflective optical shutter may be located on either side of the transparent thermal storage element. If the reflective optical shutter is thermochromic (like Cloud Gel, for example), it should be located inside the structure from the transparent insulation, so that it will turn reflective when the building and/or its thermal storage are too warm and will turn opaque when the building and/or its thermal storage are too cool, as shown in FIGS. 3A and B and 6.

Figure 7:
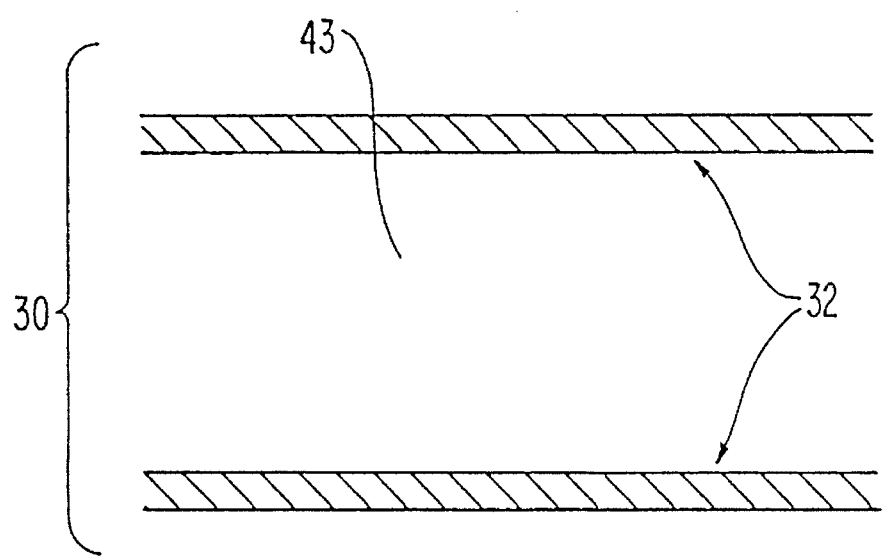
FIG. 7 shows schematically an alternate embodiment of the transparent insulation layer, in which one or two low emissivity layers are affixed to the interior surfaces of a glass-enclosed vacuum.

In another variation, FIG. 7 illustrates an alternate embodiment of the transparent insulation layer 30, in which one or two low emissivity layers 32 are affixed to the interior surfaces of a glass-enclosed vacuum 43.

Figure 8:
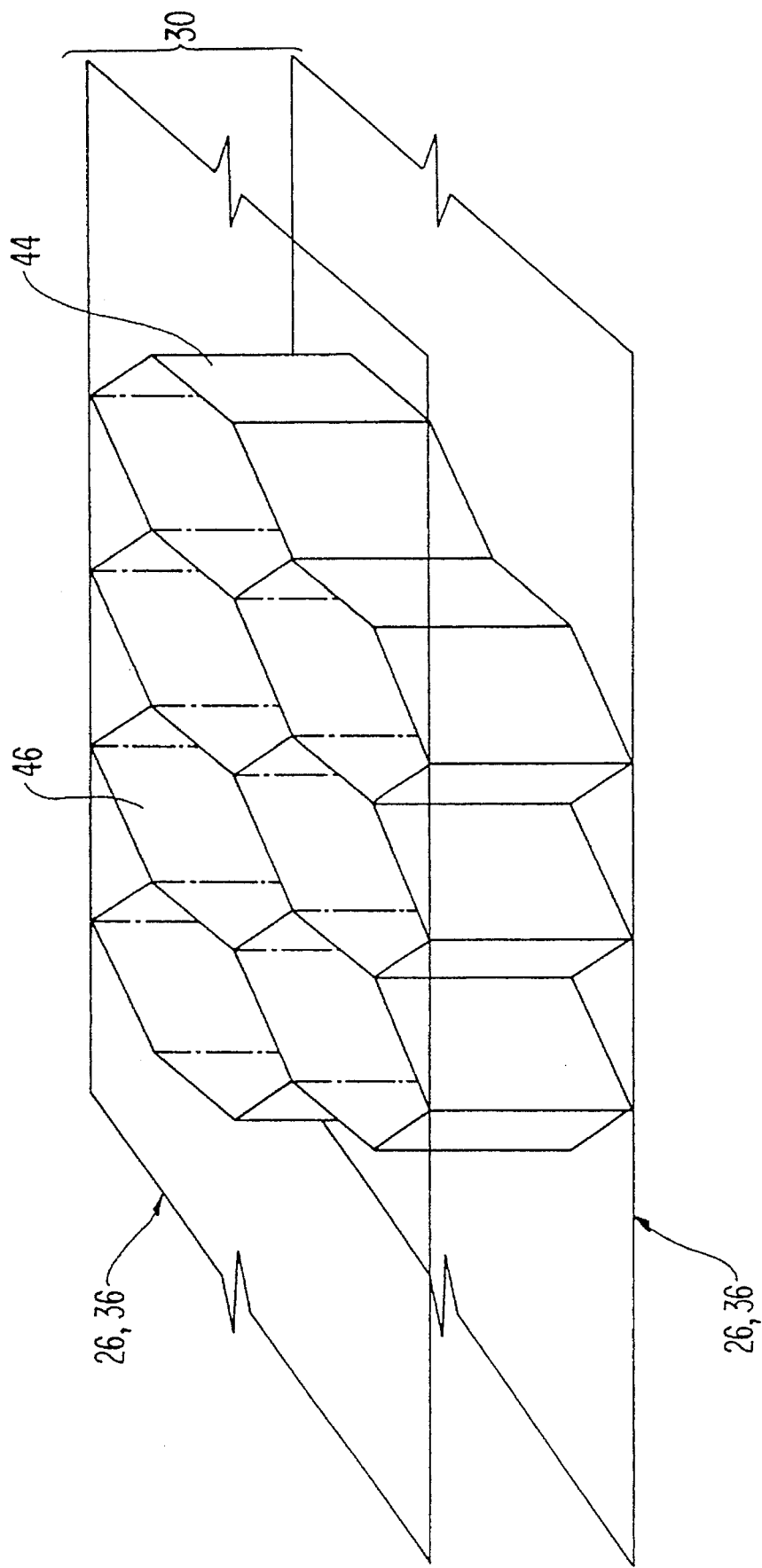
FIG. 8 shows an alternate embodiment of the transparent insulation layer utilizing a honeycomb material.

In yet another variation, FIG. 8 illustrates an alternate embodiment of the transparent insulation layer 30, in which a layer of honeycomb material 44 is oriented with its openings 46 approximately perpendicular to the encasing layers of a transparent glazing material 26. In this embodiment optical shutters 36 are optionally-placed on top of or below the layers of glazing material 26.

Figure 9:
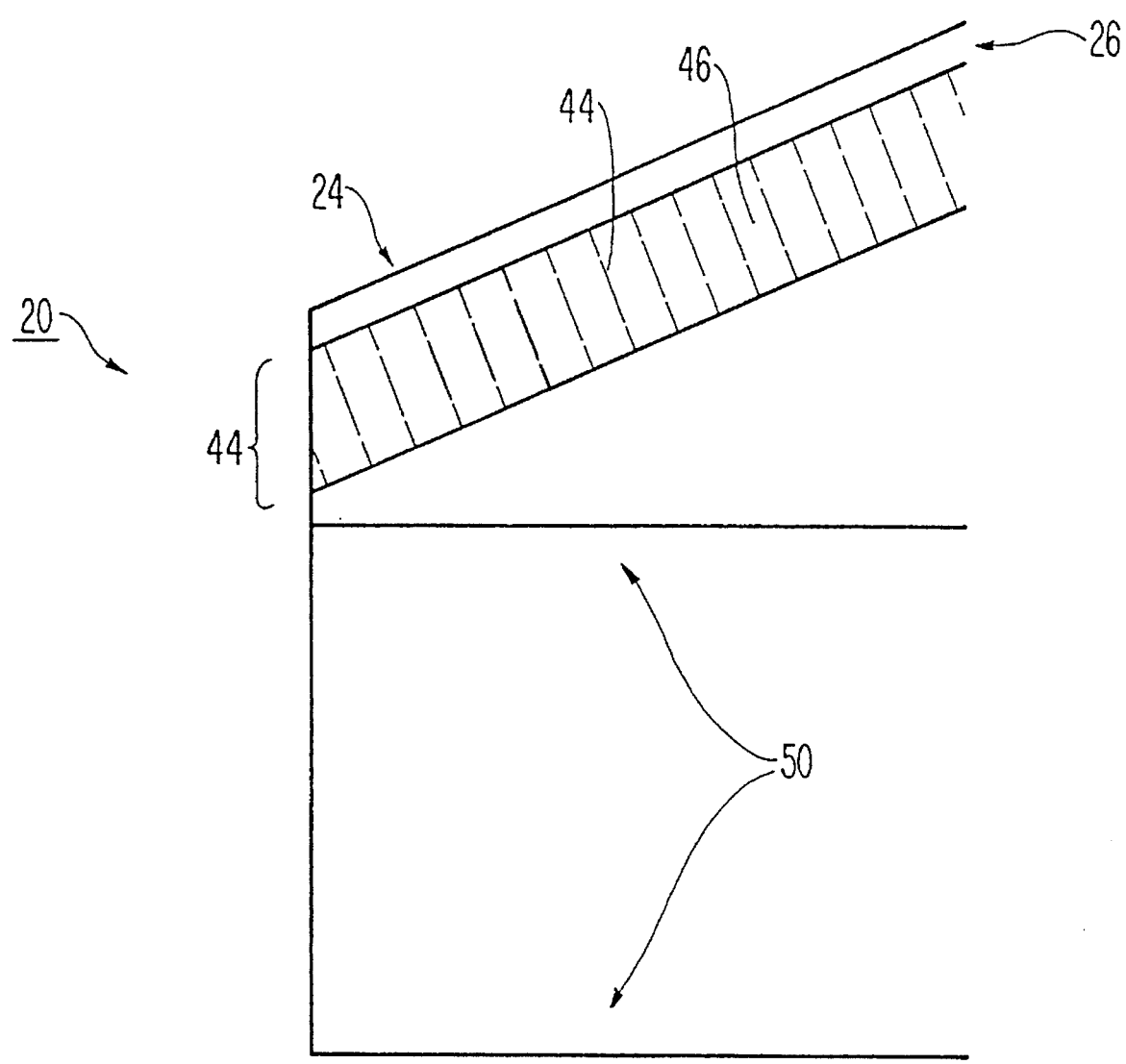
FIG. 9 shows schematically the honeycomb transparent insulation material with its openings approximately perpendicular to the structure's glazing and roof.

FIG. 9 shows the honeycomb material 44 with its openings 46 approximately perpendicular to the layer of transparent glazing material and roof exterior 24.

Figure 10:
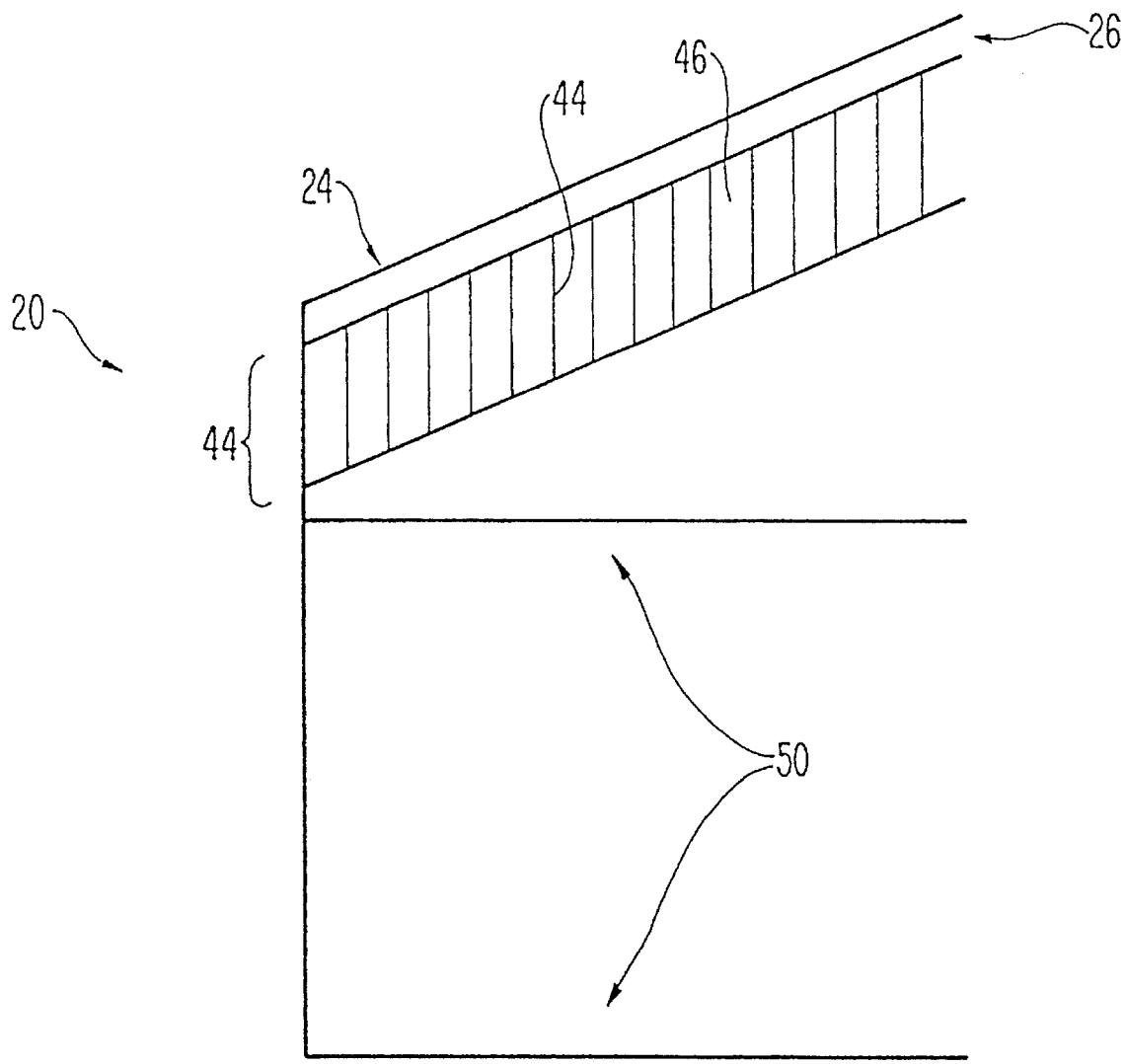
FIG. 10 shows schematically an alternate embodiment of the honeycomb material with its openings oriented approximately perpendicularly to the building's floors.

In yet another variation, FIG. 10 shows an alternate embodiment of the honeycomb material 44 with its openings 46 oriented approximately perpendicular to the building's 20 floors 50.

Figure 11:
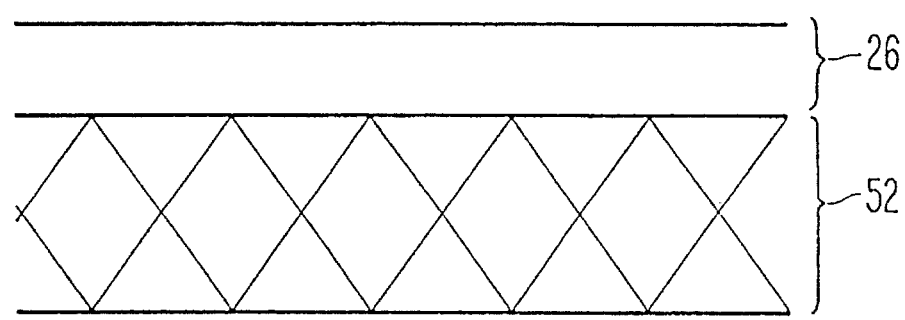
FIG. 11 shows schematically an alternate embodiment of an aerogel transparent insulation layer.

In a further variation, FIG. 11 shows an alternate embodiment of the transparent insulation layer, comprised of aerogel 52 which is adjacent to the layer of transparent glazing material 26. The aerogel 52 is a finely divided material with solid elements thinner than ¼ wavelength of solar radiation (100 nm) but absorbing of thermal radiation.

Suitable transparent insulation components exemplified in FIGS. 7–11 are known in the art and they are exemplified by: honeycomb structures, disclosed by Volker Wittwer "Transparent Insulation Materials," OPTICAL MATERIALS TECHNOLOGY, p 284, March 1990, International Society For Optical Engineering; convection baffles, disclosed in my application Ser. No. 07/670,783; honeycomb structures and low emissivity coatings disclosed in U.S. Pat. Nos. 3,953, 110, 4,085,999 and 4,389,452, all by D. Chahroudi; Vacuum disclosed by J. D. Garrison in "Evaluation of a Thermally Circulating Vacuum Window," 15th National Passive Solar Conference, p. 43, American Solar Energy Society, March 1990; and aerogels, disclosed by M. Mielke et al. in "Aerogels—a new class of material," presented at The 1st International Workshop on Transparent Insulation Materials for Passive Solar Energy Utilisation, p. 25, Nov. 27–28, 1986, German section of International Solar Energy Society. All of the aforementioned patents and publications are incorporated herein by reference in their entirety.

Figures 12A, 12B:
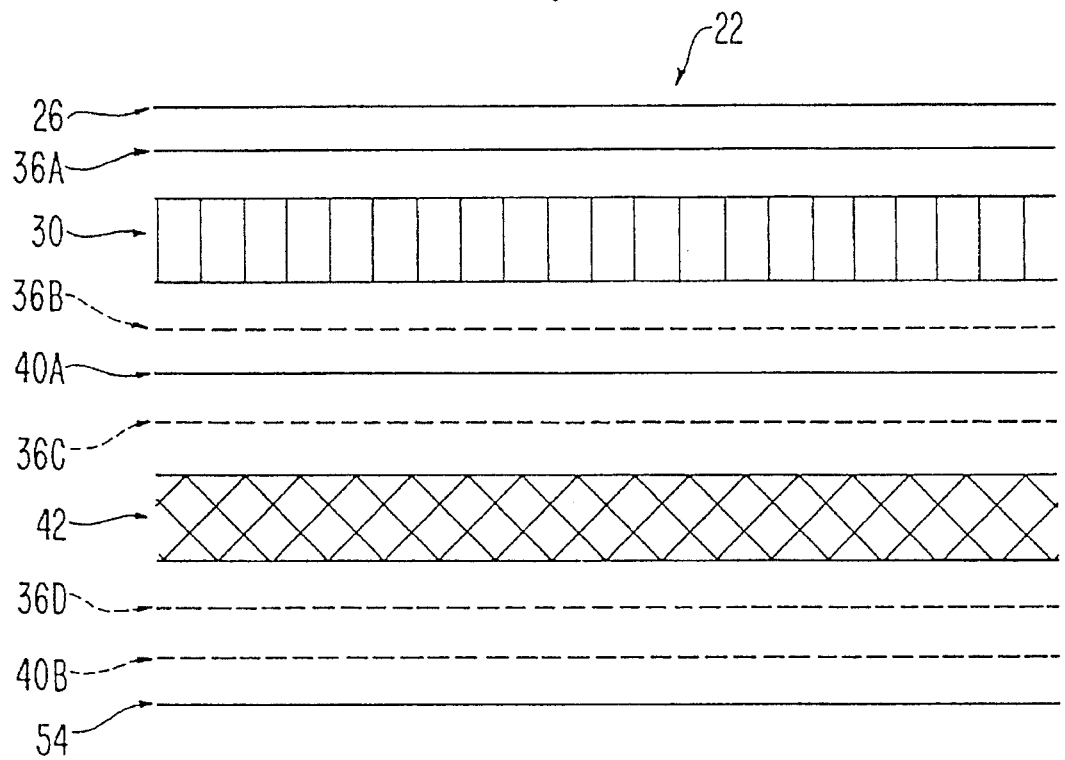
FIG. 12A shows the various possible locations of all of the necessary and optional layers to the solar collector.
FIG. 12B shows the identity of the various possible layers depicted in FIG. 12A.

Although the need for heat storage is substantially reduced with the use of the solar collectors used herein, it is not completely eliminated and heat storage helps to ensure sufficient heating capacity to provide heat to the building overnight. In FIG. 12A, there is shown schematically a variety of relative locations of various necessary and optional layers which can be used to form a solar collector 22. This Figure is included to provide a basis for explaining hereinafter various alternative embodiments of the construction of the solar collector 22. In FIG. 12A, a cross-section of a solar collector 22 includes a heat storage element 42; similar heat storage elements are shown in: FIG. 13 (elements 50 and 56); FIG. 14 (element 50); and FIG. 2 (element 25).

As shown in FIG. 12A, the location of the heat storage element 42 may be below and in proximate location (also referred to herein as "heat transfer relationship") to a part of the solar collector 22. By proximate location (also referred to herein as "heat transfer relationship") it is meant that the heat storage element 42 is positioned in such a relationship to the rest of the solar collector that the energy received by the solar collector is transferred to the heat storage element 42 by heat transfer mechanisms, as described hereinafter. For example, FIG. 12A indicates several of the possibilities for the heat storage element 42 location, e.g., between and adjacent to the solar radiation absorbing material, whose location is alternatively indicated as 40A or 40B, and the optional interior finish 54 and optical shutter 36B or transparent insulation 30. Heat storage element 42 must be placed below the transparent insulation 30, as shown in FIG. 12A. If the heat storage element 42 is transparent, then a reflective thermochromic optical shutter 36 may be located on either side of the transparent heat storage element 42 as indicated by alternative locations 36C or 36D. If the reflective optical shutter 36 is thermochromic, it should be located inside the structure 20 (not shown) from the transparent insulation 30 so that the reflective optical shutter will become reflective when the structure 20 (not shown) and its heat storage element 42 are too warm, and the reflective optical shutter will turn opaque when the building 20 and/or its heat storage element 42 are too cool, as shown in FIGS. 3A, 3B and 6. A more complete description of various exemplary embodiments possible with the diagram of FIG. 12A is included in Examples 14 and 15 of this application.

FIG. 13 illustrates several additional variations on the placement of the heat storage element 42. This figure illustrates the design for a single family home which may provide fresh fruit, vegetables, flowers, water and air in addition to heat for a small increase in cost over the other embodiments of the invention. For example, the heat storage element 42 (not shown) may be (located in) the floor 50 below the roof 24, or in the space 60 between the floor 50 and the roof 24, or in objects such as plants 62 and soil (56) in the greenhouse 60 which are located in the top story or attic 64 of a building 20, within the insulating envelope 23 of the building 20. As shown in FIG. 13, the greenhouse 60 with shade provided by potted trees and rows of planters hanging just below the ceiling makes the top floor 64 free from glare. This space may then be used as a living room, dining room or kitchen. The soil 56 for the plants 62 provides thermal storage. The plants 62 freshen the air by removing pollution and replacing $CO_2$ with $O_2$. Water that has been used for washing and household chores is fed to the plants, where it ultimately transpires from the leaves. This distilled transpiration condensate may be collected from the inside surface of the solar collector 22 ceiling.

Alternatively, the heat storage element 42 can be located in objects already located for other purposes within the insulation envelope 23 of the building, by way of example, objects that are located in the building 20 for reasons other than heat storage. Thus, for example, a sheetrock or plasterboard wall or ceiling surfaces or a cement floor or furniture all store heat well, but are normally placed inside a building 20 without regard to their ability to store heat. The attic 64 shown in FIG. 13 represents a solar still. A solar still is an apparatus which uses solar radiation to purify water through evaporation and condensation, and then collecting the condensate. In FIG. 13, water content in the air, for example, humidity transpired through the leaves of plants, rises upwards towards the roof due to air currents and diffusion, where it is condensed on the glass surface. The condensation is then collected as purified water. The plants 62 perform the function of an evaporator 70 (not shown separately) and the interior surface of the solar collector 22 performs the function of a condenser and collector of distilled water 72. Condensation flows along the interior surface of the solar collectors to a collection point and collection trough 74 at the lower edge 54 of the roof 24 (see FIGS. 13, 18 and 20).

FIG. 14 is a schematic illustration of air flow through the building 20. As shown in FIG. 14, heat transfer may be accomplished by means of air circulated by fans 76 through ducts 80. In FIG. 14 for example the ceilings 50 serve as heat storage elements. Heated air is driven from the heat storage elements 24 and 26 by a fan 76 through a duct 80 to the remainder of the building's 20 interior. In winter, heat may be circulated from the attic or top floor 51 to the remainder of the building 20 in this way. The air circulation loop (59 A, B & C) is completed through ceiling/floor vents 58 (only one of which is shown, but several of such vents may be included) from the lower floors 59 to the attic 51. In the summer, the same fan 76 may be used to circulate outside air through the attic 51 by obtaining the air from the outside through vent holes (not shown) customarily provided in most roof buildings. During daytime, heat circulation dumps out the heat load caused by the small solar energy transmission of the solar collectors 22 in their opaque state. At night the fan 76 cools the whole building 20 and thermal storage elements 50 with night air. The pattern of air circulation is schematically illustrated in FIG. 14 by arrows 59A, 59B and 59C.

Figure 15:
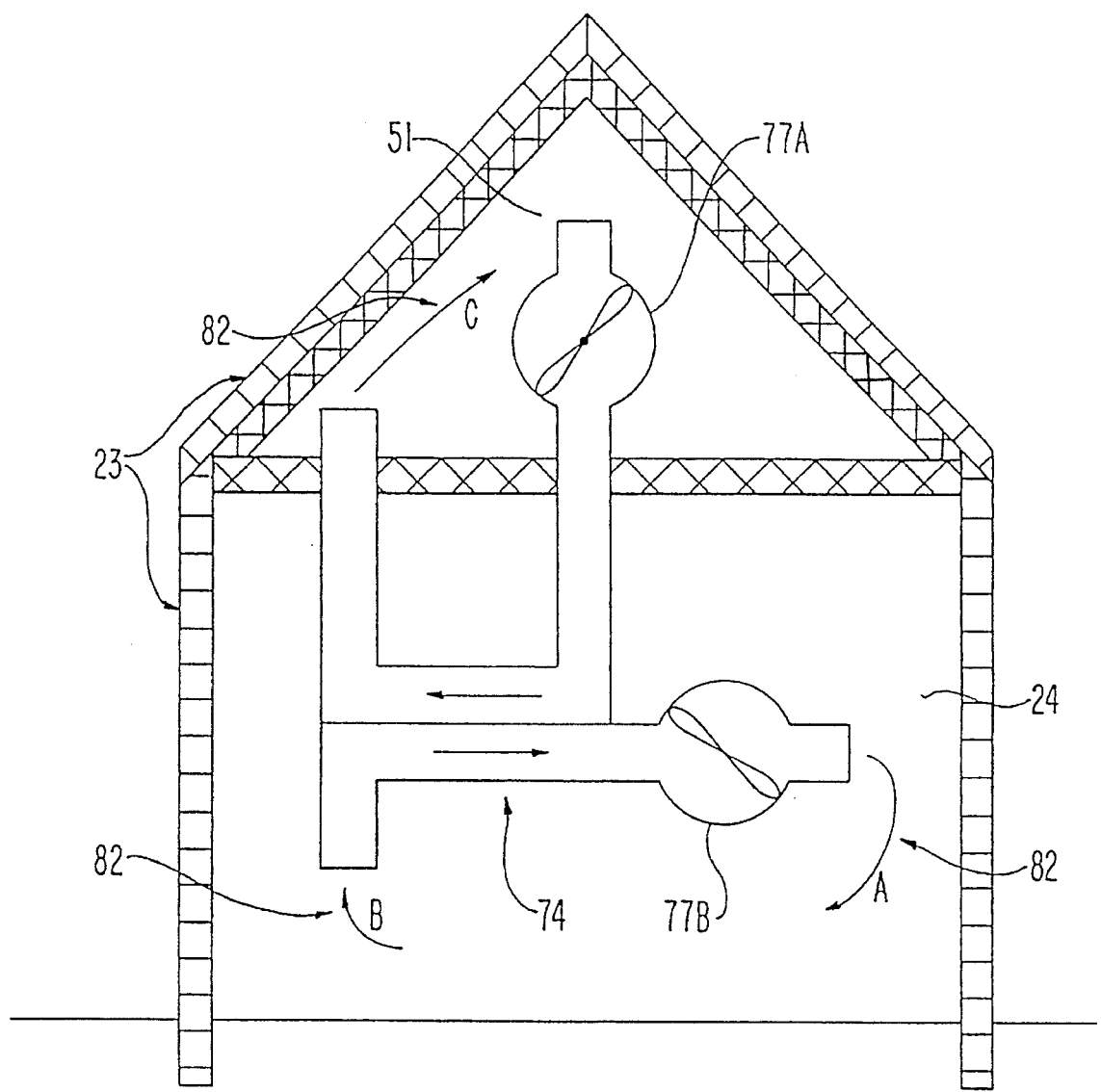
FIG. 15 shows schematically an air-to-air heat exchanger including separate fans connected thereto which drive the air in both circulation loops.

FIG. 15 illustrates an air-to-air heat exchanger 74 including separate fans 77A and 77B connected thereto which drive the air in circulation loops 82. The air-to-air heat exchanger 74 can be used to transmit heat retained in an upperlevel greenhouse (represented by the attic 51 and in FIG. 13 by 60) to the lower level of a building within the insulation envelope 23 while preventing humidity from leaving the upper level of the building's 20 interior 24. The pattern of air circulation is also schematically illustrated in FIG. 15 by arrows A, B and C.

Figure 16:
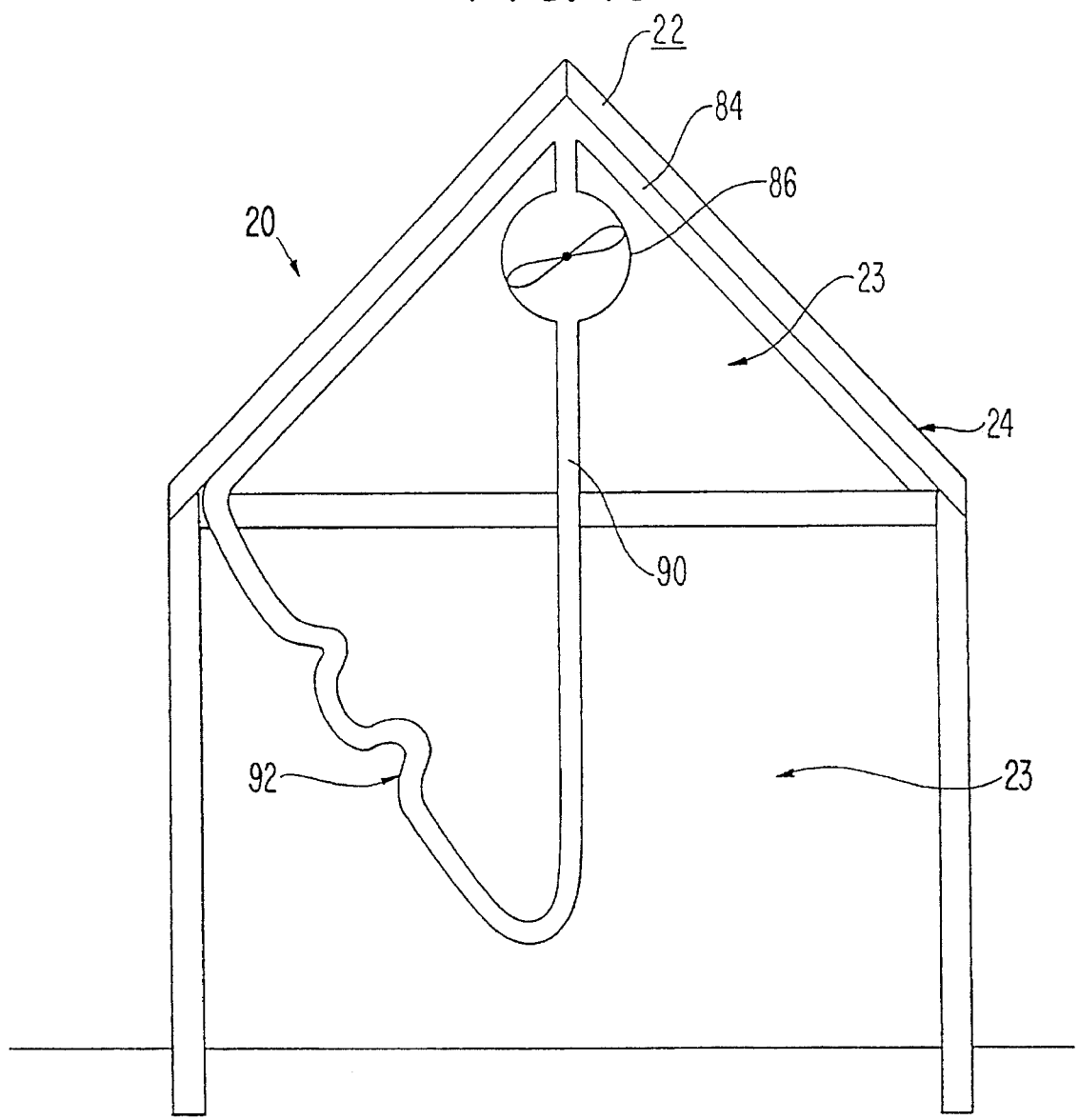
FIG. 16 shows schematically heat circulation with water, pipes and pumps.

FIG. 16 shows an alternative embodiment wherein heat is stored in water. In FIG. 16, for example, the roof 24 of the building 20 is equipped to retain water 84, and the heat retained by the water 84, derived from the solar collectors 22 is circulated to other portions of the building's 20 interior 23 by means of a pump 86 and a network of pipes, exemplified by pipe 90 which is connected to a series of heating elements throughout the building 20 interior. Suitable heating elements are, for example, radiators, such as a radiator 92. In this way the entire insulation envelope 23 is heated. The roof 24 retains water in any suitable manner. For example, the roof may be constructed of metal sheets with tubes soldered to them or of plastic extrusions with channels for water heat storage and circulation.

FIG. 17 illustrates an embodiment wherein heat storage elements 42 are contained in the floor 50 below the solar collector roof 24, heat transfer to the remainder of the building's 20 interior 83 can occur by means of thermal radiation, schematically illustrated by an arrow A.

FIG. 18 illustrates placement and operation of a solar still 66. Impure water 70 is evaporated on the attic floor 50 and condensed on the interior portion of the solar collector 22. The resultant condensate, or distilled water is then collected by collection means 72 located at the lower edge 54 of the ceiling 22. The impure water is, for example bad well water or wash water from clothes, dishes and bodies of humans. The floor 50 must be constructed in such a fashion that it is able to support a one inch or greater layer of water. The floor 50 is therefore made of, for example, a water proof plastic film on top of a level roof of conventional construction. The collection means is troughs 74 at the bottom edge of the ceiling and (not shown) end walls.

Figure 19:
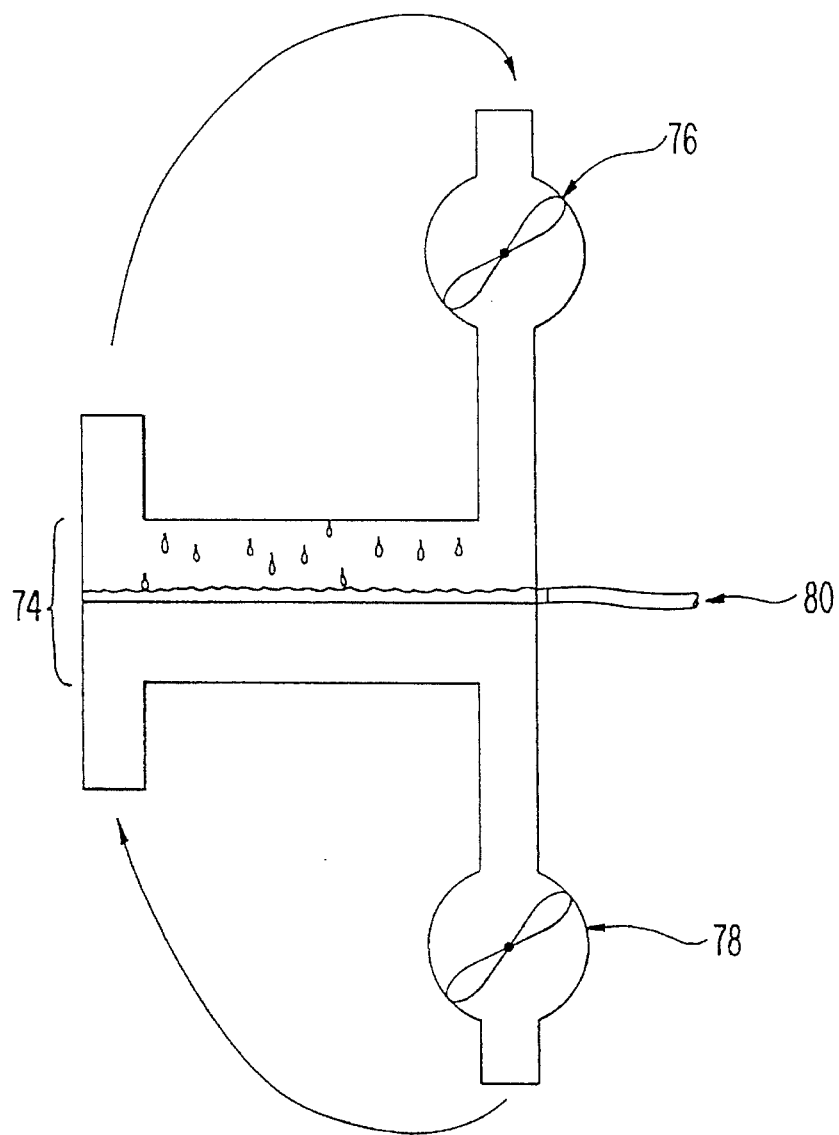
FIG. 19 shows the operation of an air-to-air heat exchanger.

FIG. 19 shows the operation of the air-to-air heat exchanger 74, in which fan 76 drives humid heated air and fan 78 drives relatively cooler air through a condenser apparatus which may be, for example, no different from a conventional heat exchanger wherein condensate drops accumulate and flow to a condensate outlet pipe 80. This figure is a detail of the heat exchanger in FIG. 15 and is installed in the building in the same way. Heated moist air is produced for example by the attic 66 in FIG. 18 or 64 in FIG. 13. Cooler air comes from the building below the solar collector and water evaporator 68 in FIGS. 13 and 18.

Figure 20:
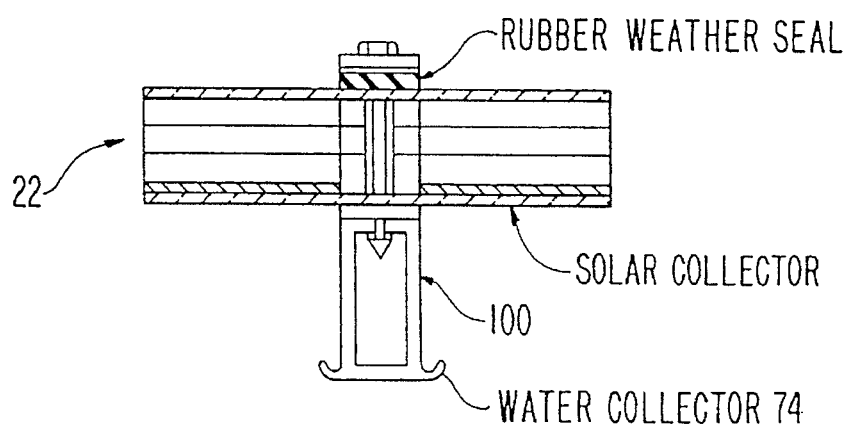
FIG. 20 shows the framing detail of attachment of multiple solar collectors to the rafter of the roof of a building and the condensation channels for collecting distilled water.

FIG. 20 illustrates the framing detail of the attachment of multiple solar collectors 22 to the rafter 100 of the roof (not shown) of a building (not shown); 74 are the channels for collection of distilled water. The solar collectors 22 are sealed by a rubber weather seal to a grid of rafters 100 made from wood, steel or aluminum.

The HETIOSSC used herein may include a layer of optical shutter, protective glazing, optional heat storing elements, optional solar absorbing material and transparent insulation; the transparent insulation may, for example, be made of low emissivity layers, or low emissivity layers with convection baffles, or low emissivity layers with a layer of vacuum, or honeycomb material or aerogel material. Several components of the HETIOSSC used herein are the subject of issued and co-pending U.S. patent applications. For example, U.S. patent application Ser. No. 07/670,784, entitled "Specularly Transmitting and Diffuse Reflecting Optical Shutter," describes a possible optical shutter component of the present invention. Similarly, U.S. patent application Ser. No. 07/670,783, entitled "Light Admitting Thermal Insulating Building," describes some configurations of glazing, transparent insulation optical shutter, and absorber components of the present invention. Briefly, HETIOSSC is a solar collector with layers of: transparent glazing forming the building's exterior surface; a transparent insulation with a thermal conductivity less than 0.3 BTU/ft/°F./hr.; an optical shutter which transmits three or more times as much solar radiation energy in its transparent state as in its opaque state; and optional layer of solar absorbing material; an optional layer of thermal storage material; and an optional layer of interior finish. A HETIOSSC replaces a roof or wall element in a building. In its transparent state, an HETIOSSC has a solar transmission (more precisely, hemispherical solar energy spectrum transmission) of greater than 30%. What is claimed in this application is not HETIOSSC or other solar collectors, but building design using such solar collectors.

The novel passive solar heated heating design strategy of the present invention wherein high performance transparent insulations are used to collect solar energy during cloudy weather is highly effective for solar heating. Thermal modeling indicates that this design strategy may result in 80–100% solar heating in Boston and 63–100% in Berlin, both cities with cold and very cloudy winters, depending on the particular building design. Because heat is collected during cloudy weather, only overnight thermal storage is needed and the backup heater can be smaller and less expensive. Also, because part or all of the roof is used as the collector and because solar performance is relatively insensitive to collector orientation (solar radiation comes from all directions during cloudy weather) aesthetic impact is minimal and thus, the architect or contractor has almost complete freedom of design. A transparent insulation and optical shutter can be combined into a roof with a cost comparable to average conventional roof construction. These HETIOSSC make possible a design strategy for passively heated buildings which performs well in northern climates and which is comparable in initial costs and ease of design and construction with a building heated entirely with fossil fuel.

With the advent of HETIOSSC technology, described in U.S. Application, Ser. No. 07/670,783, referenced, supra, an entirely different design strategy has become possible. The transparent insulation components of HETIOSSC can include low emissivity coatings, convection baffles, transparent capillary and honeycomb buildings, evacuated windows, aerogels, and multiple panes of anti-reflected plastic film or glass. (see Transparent Insulation Technology for Solar Energy Conversion; International Workshop at the Fraunhofer Institute; Freiburg, Germany; 1986, 1988, 1989, 1991; Transparent Insulation Materials, Volker Wittwer, Optical Materials Technology, P. 284, March, 1990, International Society for Optical Engineering; U.S. Pat. Nos. 3,953,10, applied for 1974; 4,085,999, applied for 1976; and 4,389,452 applied for Jan. 18, 1978, all by Day Chahroudi;

"Evaluation of a Thermally Insulating Vacuum Window," John D. Garrison, 15th National Passive Solar Conference, P. 43, American Solar Energy Society, March, 1990. Aerogels—A new class of Material, M. Mielke, Transparent Insulation Materials, P. 25, November, 1986, German section of International Solar energy Society.) These materials have insulating values equal to one to two inches of plastic foam, which is comparable (but not necessarily equal) to the insulating value of typical roof and wall construction. At the same time, these high performance transparent insulations transmit from 50% to 70% of incident solar energy.

The insulation value of these transparent insulation materials is high enough that the solar collector can be integrated into the building's construction without using a separate layer of opaque insulation to prevent nighttime heat losses. Thus, the HETIOSSC can be directly substituted for a complete roof or wall element, rather than being added externally. Since HETIOSSC may cost no more than an average roof or wall, the cost of installing solar space heating is greatly reduced.

Because this novel design strategy calls for collecting heat on cloudy days, the HETIOSSC surface points up at the clouds. Thus the roof, rather than the south wall, becomes the preferred location for solar collectors. An added benefit of replacing roof rather than wall panels with solar collectors is minimal impact on building esthetics—a HETIOSSC solar heated building would differ in appearance from a conventional non solar building only in having its roof glazed. Because cloudy weather sunlight comes from straight above, orientation of the HETIOSSC heated building and its roof collector is not crucial, nor is the floor plan, allowing the architect almost complete freedom of design. Because sunlight is less intense during cloudy weather, a large collector area is called for, so more than half of the roof should consist of HETIOSSC, depending on local climate.

The convection baffle is added to the low emissivity coating as shown in FIGS. 3A, 3B and 3C. A suitable material for a convection baffle is a clear plastic film. The use of these films as a convection baffle can almost double the insulating value of the low emissivity coating and is available at a fraction of the cost of a second low emissivity coating. Convection baffles can be made of sunlight resistant polyethylene with excellent solar energy transmission properties of up to 92%. Their function is to inhibit convection currents within the air spaces of HETIOSSC without interfering with the operation of the low emissivity coated glass or plastic film. This polyethylene, unlike most plastics, is 90% transparent to long-wave infrared radiation between 3 and 40 microns wavelength, the kind of radiation that transfers heat. (If the baffles absorbed much IR, they would act to transfer thermal radiation despite the low emissivity coated layer and greatly diminish the low emissivity layers' effectiveness.) Unlike most polyethylenes, this one is extremely transparent to sunlight and can hold up under the sun's ultraviolet rays for 30 years. Convection baffles double the thermal resistance of a HETIOSSC over using low emissivity coatings alone, and they cost very little.

The insulating value of HETIOSSC can be comparable to conventional walls and roofs. Their expected lifespan can be up to 30 years. When production volumes become large, they may cost no more than an average wall or roof which captures no solar heat or illumination. If they are installed in the wrong place, they simply turn opaque and stay opaque, resulting in little excess heat gain or loss, or glare.

With one layer of low emissivity coating, two layers of convection baffle, and a layer of Cloud Gel (see FIG. 3A), the HETIOSSC has a thermal conductivity of 0.20 BTU/ft$^2$/°F./hr. (1.1 watt/sq meter °K.) and solar transmission which varies between 70% and 7%, with most of this change occurring over a change of 3° F. (about 2° C). The high degree of light transmission of this HETIOSSC configuration recommends it for greenhouse use. With two layers of low emissivity coating alternating with four layers of convection baffle, plus one layer of Cloud Gel (see FIGS. 3B and C), the thermal conductivity is 0.10 BTU/ft$^2$/°F./hr. or (0.57 watt/sq meter °K.), with solar transmission of 50% to 5%. The low thermal conductivity of these Weather Panels makes them suitable for collecting heat during cloudy weather.

The HETIOSSC may be surfaced with a glazing of either plastic film, low iron glass, fiber reinforced plastic, or plastic sheet in order to serve various market segments, including passive space heating, daylighting (skylights), greenhouses, and a transparent building enclosure which generates its own climate (see FIG. 2). This type of transparent insulation enclosure, as previously disclosed by Day Chahroudi, 14th U.S. Passive Solar Conference, Denver, U.S.A. (1989), incorporated herein by reference in its entirety had a thermal conductivity of greater than 0.30 BTU/ft$^2$/°F./hr. and therefore had lower thermal performance than the transparent insulation enclosure used herein. The building designs disclosed in that paper would not perform well in northern climates if they used the previously disclosed transparent insulation which was a low emissivity coating without convection baffles. Therefore, it is important that the solar collectors used in this invention use transparent insulation which has a thermal conductivity less than 0.30 BTU/ft.$^2$/°F./hr.

As is shown in FIG. 3C, any of these HETIOSSC configurations may have their indoor surface painted a dark color to match the building's exterior and to absorb solar radiation. This surface may then be covered with, for example, wallpaper or plaster for an interior finish. The shadow cast by the Weather Panel edges and the structural framing system shown in FIG. 20 is only about 4%.

Although the design strategy based on using HETIOSSC to collect sufficient solar heat during cloudy weather greatly reduces the requirements for thermal storage of the solar heat which they collect, the need for thermal storage is not eliminated. However, only overnight storage is needed to heat the building until the next cloudy day. Overnight storage may be in the walls, ceilings and furniture already in the building, or a separate heat storage element may be used, as is shown in: FIG. 2 (element 25); FIG. 9 (element 50); FIG. 10 (element 50); FIG. 12A (element 42); FIG. 13 (elements 50 and 56); FIG. 14 (element 56); FIG. 16 (element 56); FIG. 17 (element 50); FIG. 18 (element 70). Computer modeling has shown that the percentage of annual heating load supplied by solar heating increases rapidly as thermal storage increases up to the amount needed for overnight storage on the average day of the coldest month of the year in the climate where the building is located. However, the percentage of heating supplied by solar energy increases very slowly when the amount of thermal storage is increased beyond overnight storage because heat is supplied by the next day's cloudy weather, unlike the conventional sunny weather passive design strategy.

EXAMPLES 1 TO 13

COMPUTER MODELING BUILDING SOLAR PERFORMANCE

Thermal modeling results for 13 examples of computer modeling of building solar performance are summarized in the chart below. Boston and Seattle have some of the worst weather in the U.S. for passive heating. Tokyo, Paris and London have winter climates very similar to Boston and Seattle. These results are a bit optimistic; real buildings only closely approach the performance of their computer models, depending on the builder's skill. Because the non solar reference building is so well insulated, the percentages of supplementary heat indicated in the chart represent small absolute values of heat. These performance figures are much better than is achievable in these cloudy climates by the previous strategy of designing collectors for sunny winter weather and storing heat for cloudy days. Calpas 3, developed by USDOE Lawrence Berkeley Laboratory, available from Berkeley Solar Group, Berkeley, Calif. was used to generate the percentage solar heating performances in the chart.

EXAMPLES 1–13

PERCENTAGE SOLAR HEATING

|  | (Example Nos. In Parenthesis) | | |
|---|---|---|---|
| Building Weather Panel | FIGS. 1 and 13 through 18 FIG. 3B or C | FIG. 2 FIG. 3B | FIG. 2 FIG. 3A |
| Boston | 80% (1) | 100% (6) | 97% (10) |
| Seattle | 76% (2) | 100% (7) | 90% (11) |
| Munich | 77% (3) | 100% (8) | 86% (12) |
| Berlin | 63% (4) | 100% (9) | 86% (13) |
| super insulated | 79% (5) | | |

The performance of the designs shown in FIGS. 1, 2, and 13 through 18 were modeled using the Calpas 3 program.[1] Since this program does not model optical shutters, the HETIOSSC were assumed to always be at their maximum transmission and excess heat was vented. Since the buildings in FIGS. 1 and 13 through 18 have almost the same collector to wall area ratios, they are assumed to have almost the same solar performance. The following assumptions were used for the buildings in FIGS. 1 and 13 through 18: the roof is oriented with its ridge at 45° to the north-south axis to simulate a random orientation; thermal storage is in a two inch (5 centimeters) uninsulated concrete floor of the attic (see FIG. 13, element 50, for example), except in Berlin, where it is six inches (15 centimeters) thick; wall conductivity is 0.05 BTU/ft$^2$/°F./hr. (0.28 watts/sq meter/°hr.); windows are 10% of the floor area, and have a conductivity of 0.17 BTU/ft.$^2$/°F./hr. (1.0 watt/meter$^2$/°hr.); the foundation has a conductivity of 0.10 BTU/ft$^2$/°F./hr. (0.19 watts/meter$^2$/°hr.); the infiltration rate is one air change every four hours for the apartment, and eight hours for the attic or greenhouse. The minimum temperature inside the apartment and the attic or greenhouse is 65° F. (18° C.) during the day, and 60° F. (15° C.) for seven hours during the night; the attic is the same temperature as its heat storage floor. The attic fan's rate is 5,000 cfm (10,000 cu meter/hr) for the building in FIG. 1; for the building in FIG. 2, the same assumptions as above were made when they applied, except the thermal storage is six inches (15 centimeters) of concrete; the building of FIGS. 1 and 13 though 18 can be "super-insulated" by reducing the infiltration from one quarter to one eighth air change per hour, and by increasing wall insulation from a conductivity of 0.05 BTU/ft$^2$/°F./hr. (0.28 watts/sq meter °K.). The percentage of solar heating was computed in relation to buildings which are identical to the above buildings except that the roof is opaque and has a conductivity of 0.05 BTU/ft$^2$/°F./hr. (0.28 watts/sq meter/°K./hr.) and the windows do not use HETIOSSC, but only low emissivity coatings, and so have a conductivity of 0.33 BTU/ft$^2$/°F./hr. (1.9 watts/sq meter/°K./hr.)

[1] Calpas 3, developed by USDOE Lawrence Berkeley Laboratory, is available from Berkeley Solar Group, Berkeley, Calif.

Description of Weather Data Used

The CALPAS 3 model uses hourly weather data for one entire year to simulate the building solar heating performance. There exist over 200 of these data sets for the US. These US data sets are called TMY (Typical Meteorological Year) data sets. While it is possible to model shorter periods, to get precise annual performance, something equivalent to a full year is required. Since a complete typical (or average) year in Europe was not easily available to us, we chose to use a method which should give accurate results: that of creating 12 short data sets each representing an average month for the location under consideration and similar means deviations. Each of these data sets was selected from the TMY data sets for the US, which had average weather characteristics closest to the location under consideration. For each month, a sequence of 2 to 5 days was selected from the TMY, which had average values of solar radiation and temperature closest to that of the average value of the location under consideration. The number of days depended on the mean deviation for that month. The simulation was then run for the short period, and the results were taken as representative for the months.

Description of the Calpas 3 Model Variables Used

TITLE: This is just a descriptor, not used in the calculations.

AZMSOUTH: This was set to 45°. It means the building is rotated 45° from the true north-south orientation.

Those following refer to the heated portion of the building, not the sunspace (the space between optical shutter and thermal absorber, such as the greenhouse or attic in FIG. 13):

HOUSE; FLRAREA is the floor area of the heated space (square feet), VOL: volume of the heated space (cubic feet). These parameters are required by the program. When we were modeling a sunspace alone, as in FIG. 2, we set these values to one.

ROOF: AREA is the roof area (square feet). This parameter is required by the program. Since we were modeling a configuration with the sunspace on top of the building, there was no roof. We set this value to one.

WALL: The following apply to any opaque vertical exterior surface of the heated building. NAME is a descriptor, not used in the calculations. AREA is the area of the surface (square feet). AZM is the azimuth (compass direction) of the normal to the surface (degrees, 0–360). UVAL is the thermal conductivity of the surface in BTU/ft$^2$/°F./hr.

GLASS: NGLZ is the number of glazings. The other parameters are defined the same as for preceding WALL.

INFIL: ACBASE: the number of air changes per hour in the heated space due to infiltration.

INTGAIN: INTGAIN are other sources of heat inside the heated space (kWh/day).

VENT: TYPE=NATURAL models natural ventilation with inlet and outlet at 10% of the glass area, height difference of 2 feet for stack effects, and uses non directional wind for wind effects.

TSTATSWNTR: THEAT is the heating setpoint for backup heat to come on.

THEATNIGHT is the thermostat set point for nighttime backup heat to come on.

TIMEDOWN is the time when the control setpoint switches from the daytime to the nighttime control point.

The following refer to the sunspace:

SUNSPACE: These definitions are the same as for the HOUSE above.

SSROOF: These definitions are the same as for the house ROOF above.

SSWALL: These definitions are the same as for the house WALL above.

SSMASSWALL: AREA: the area of the mass wall (or floor in our case), (square feet). THKNS the thickness of the mass wall (inches). MATERIAL the material of the mass wall (used to calculate the thermal mass and conductivity). HTASS: heat transfer from the mass wall inside surface into the sunspace air (Btu per hour per square foot per degree Fahrenheit). HTAHS: heat transfer from the mass wall into the heated space air (Btu per hour per square foot per degree Fahrenheit). HOLGLS: heat transfer from the mass wall onto the exterior glazing for the mass wall (Btu per hour per square foot per degree Fahrenheit). HGTASS: heat transfer from the sunspace glazing into the sunspace air (Btu per hour per square foot per degree Fahrenheit).

SSMWGLASS: these refer to the SSMASSWALL glazing just preceding. AZM: (same as AZM for house GLASS). UGLASS: (same as UVAL for house GLASS). (0 means no thermal energy lost or gained.) XRFLCT: the fraction of solar radiation reflected from this glazing. (1 means nothing transmitted.)

SSGLASS: these refer to the sunspace glazing. (this statement and the following two are repeated for each glazing with different characteristics.) AREA: (same as the AREA for the house GLASS). AZM: (same as AZM for house GLASS.) UVAL: (same as UVAL for house GLASS.) NGLZ: (same as NGLZ for the house GLASS.) TILT: the inclination of the glass from the horizontal (degrees). XRFLCT: the fraction of the solar radiation reflected from this glazing.

SGDISTWNTR: SSAIR: the fraction of solar gain through the SSGLASS which goes into the sunspace air in the winter. SSMWO: the fraction of the solar gain through the SSGLASS which goes into the mass wall in the winter.

SGDISTSMR: SSAIR: the fraction of solar gain through the SSGLASS which goes into the sunspace air in the summer. SSMWO: the fraction of the solar gain through the SSGLASS which goes into the mass wall in the summer.

SSTSTATSWNTR: THEAT: setpoint for backup heating of sunspace in winter. TVENT: setpoint for ventilation of sunspace in winter.

SSTSTATSSMR: THEAT: setpoint for backup heating of sunspace in summer. TVENT: setpoint for ventilation of sunspace in summer.

SSCOUPLING: VENT=FAN: specifies fan coupling between sunspace and house. CFMMAX: amount of coupling (fan size). KWMAX: energy from fan added to heated space.

END: defines end of parameter list.

TABLE

TYPICAL DATA INPUT FOR CALPAS 3

```
TITLE Apartment House/ WEATHER PANEL R-10 X=50k
AZMSOUTH 45
HOUSE      FLRAREA=6200    VOL=60670
ROOF AREA=1
WALL NAME=NORTH         AREA=1320    AZM=180     UVAL=.05
WALL NAME=SOUTH         AREA=1320    AZM=0       UVAL=.05
WALL NAME=EAST          AREA=672     AZM=-90     UVAL=.05
WALL NAME=EAST          AREA=672     AZM=90      UVAL=.05
WALL NAME=DOORS         AREA=24      AZM=-180    UVAL=.2
WALL NAME=DOORS         AREA=24      AZM=0       UVAL=.2
WALL NAME=PERIMETER     AREA=80      AZM=-90     UVAL=.05
WALL NAME=PERIMETER     AREA=160     AZM=0       UVAL=.05
WALL NAME=PERIMETER     AREA=80      AZM=90      UVAL=.05
WALL NAME=PERIMETER     AREA=160     AZM=180     UVAL=.05
GLASS NAME=SOUTH        AREA=200     AZM=0       NGLZ=2     UVAL=.167
GLASS NAME=NORTH        AREA=200     AZM=180     NGLZ=2     UVAL=.167
GLASS NAME=EAST         AREA=100     AZM=-90     NGLZ=2     UVAL=.167
GLASS NAME=WEST         AREA=100     AZM=90      NGLZ=2     UVAL=.167
INFIL      ACBASE=0.25
INTGAIN    INTGAIN=0
VENT TYPE=NATURAL
TSTATSWNTR    THEAT=65     THEATNIGHT=60     TIMEDOWN=22
SUNSPACE    FLRAREA=3100    VOL=15190
SSROF      AREA=130    TILT=30          UVAL=.1
SSWALL     NAME-EAST   AREA =193        AZM=-90      UVAL=.05
SSWALL     NAME-WEST   AREA=193         AZM=90       UVAL=.05
SSMASSWALL    AREA=3100    THKNS=1    MATERIAL=WATER    HTASS=0 &
     HTAHS=0.2    HOGLS=0    XRFLCT=1
SSMASSWALL    AZM=0        UGLASS=0    XRFLCT=1
SSGLASS       AREA=1790    AZM=0       TILT=30    NGLZ=1    UVAL=.1 &
     XRFLCT=.47
SGDISTWNTR    SSAIR=0     SSMWO=1
SGDISTSMR     SSAIR=0     SSMWO=1
SSGLASS       AREA=1790   AZM=180     TILT=30    NGLZ=1    UVAL=.1 &
     XRFLCT=.47
SGDISTWNTR    SSAIR=0     SSMWO=1
SSINFIL       SSAIR=0     SSMWO=1
```

TABLE-continued

```
SSINFIL        ACBASE=0.125
SSTSTATSWNTR   THEAT=60      TVENT=100
SSTSTATSSMR    THEAT=60      TVENT=100
SSCOUPLING     VENT=FAN      CFMMAX=5000    KWMAX=0
;PRINTDAILY    FIRSTDAY=JAN-1              LASTDAY=JAN-31
;PRINTHOURLY   FIRSTDAY=JAN=2              LASTDAY=JAY-7
END
```

To design an appropriate solar collector the following general and specific design criteria (or rules) need to be followed. First, the general rules which must be followed are:

1. that only one layer each of the outer glazing, the shutter, the transparent insulation, the absorber, the heat storage element and the interior finish is required; and 2. an optional part of the solar collector (but needed in either the collector or the building) is the absorber, heat storage element, and the interior finish.

The specific rules to be complied with are as follows:

3. the outer glazing is on the outside;

4. if the heat storage is transparent, it may be inside or outside the absorber and the shutter;

5. the absorbing shutter is between the outside glazing and transparent insulation;

6. the thermochromic reflective shutter is both inside from the transparent insulation and outside from the absorber;

7. the thermochromic reflective shutter is outside the absorber;

8. the thermal storage is inside the transparent insulation and the shutter;

9. the heat storage element is inside the glazing and transparent insulation;

10. if the heat storage element is not transparent, then the heat storage element is inside the shutter and the absorber;

11. the transparent insulation is inside the glazing;

12. the interior finish is on the inside; and 13. the interior finish may be transparent if all-preceding layers are transparent.

The application of these rules in conjunction with a reference to FIG. 12B, results in specific embodiments for particular applications as illustrated in the following examples.

EXAMPLE 14

Application Of Design Criteria To Form A Collection Having An Absorbing Shutter

| Structure Layers* | |
|---|---|
| A | 1, 2, 3 |
| B | 1, 2, 3, 5 |
| C | 1, 2, 3, 5, 7 |
| D | 1, 2, 3, 7, 9 |
| E | 1, 2, 3, 5, 7, 10 |
| F | 1, 2, 3, 5, 10 |

*By reference to FIG. 12B-Layer Numbers

EXAMPLE 15

Application Of Design Criteria To Form A Collection Having Reflective Thermochromic Shutter

| Structure Layers* | |
|---|---|
| A | 1, 3, 4 |
| B | 1, 3, 7, 8 |
| C | 1, 3, 7, 8, 9 |
| D | 1, 3, 7, 8, 9, 10 |
| E | 1, 3, 4, 5 |
| F | 1, 3, 4, 5, 10 |
| G | 1, 3, 4, 5, 7 |
| H | 1, 3, 4, 5, 7, 9 |
| I | 1, 3, 4, 5, 7, 9, 10 |
| J | 1, 3, 4, 6, 7, 8 |
| K | 1, 3, 4, 6, 7, 8, 10 |

*By reference to FIG. 12B-Layer Numbers.

The following publications, patent applications, other references and information, are incorporated by reference herein in their entirety:

1. Application, "Light Admitting Thermal Insulating Structures, "application number 07/670,782, filed on Mar. 19, 1991, by Day Chahroudi.

2. Transparent Insulation Technology for Solar Energy Conversion; International Workshop at the Fraunhofer Institute; Freiburg, Germany; 1986, 1988, 1989, 1991.

3. Transparent Insulation Materials, Volker Wittwer, Optical Materials Technology, P. 284, March, 1990, International Society for Optical Engineering.

4. U.S. Pat. Nos. 3,953,110, applied for 1974; 4,085,999, applied for 1976; and 4,389,452, applied for Jan. 18, 1978, all by Day Chahroudi.

5. "Evaluation of a Thermally Circulating Vacuum Window," John D. Garrison, 15th National Passive Solar Conference, P. 43, American Solar Energy Society, March, 1990.

6. Aerogels—A new class of Material, M. Mielke, Transparent Insulation Materials, P. 25, November 1986, German Section of International Solar Energy Society.

7. Solar transmissions and thermal resistances as reported in this application were calculated using the Window 3.1 program from USDOE Lawrence Berkeley Laboratory. Most of these values were also measured by the Fraunhofer Institute in Freiburg, Germany; ISFH in Hanover, Germany; and BBRI in Brussels, Belgium. The measurements confirmed the computer model in every case.

8. Passive Space Heating and Daylighting Made Simple Through Materials Design; Day Chahroudi; International Solar Energy Conference, 1991; Denver, USA.

9. U.S. Pat. No. 4,307,942, applied for Jan. 18, 1978, by Day Chahroudi.

10. Copending U.S. patent applications, "Automatic Light Valves," Ser. No. 07/441,907, filed on Nov. 28, 1989, and "Structure and Preparation of Automatic Light Valves," Ser. No. 06/948,039, filed on Dec. 31, 1986, both by Day Chahroudi.
11. Large area chromogenics, Carl Lampert and Claes Gravanquist, Eds., SPIE Optical Engineering Press, September, 1988.
12. Among those developing electrochromic technologies are PPG, Pittsburgh, PA; SAGE Corp., Valley Cottage, N.Y.: the Solar Energy Research Institute, Golden, Colo.; and Lawrence Berkeley Laboratory, Berkeley, Calif. Other development efforts are ongoing in Europe and Japan.
13. Research Frontiers, Inc., Woodbury, N.Y., is working on a process that encapsulates particle-laden drops of liquid in plastic film.
14. Climatic Envelope; Day Chahroudi; 14th U.S. Passive Solar Conference; 1989, Denver, USA. The transparent insulation shown in this reference had a thermal conductivity of approximately 0.35 BTU/sq ft./°F./hr.
15. Calpas 3, developed by USDOE Lawrence Berkeley Laboratory, available from Berkeley Solar Group, Berkeley, Calif.
16. Passive Solar Design Handbook, Vol. III, American Solar Energy Society, Boulder, Colo.

DEFINITIONS

For the purpose of this application, the terms used in the application are defined below:

A "high efficiency transparent insulation optical shutter solar collector (HETIOSSC)" is a solar collector with layers of: transparent glazing forming the building's exterior surface; a transparent insulation with a thermal conductivity less than 0.3 BTU/sq. ft./°F./hr.; an optical shutter which transmits three or more times as much solar radiation energy in its transparent state as in its opaque state; an optional layer of solar absorbing material; an optional layer of thermal storage material; and an optical layer of interior finish. A HETIOSSC replaces a roof or wall element in a building. In its transparent state, an HETIOSSC has a solar transmission (more precisely, hemispherical solar energy spectrum transmission) of greater than 30%.

A "transparent glazing" is a material which transmits solar radiation, such as glass, plastic sheet or film or translucent fiberglass reinforced plastic, and which protects the HETIOSSC from the weather.

A "transparent insulation" is a material which transmits solar radiation well but does not transmit heat well.

An "optical shutter" is a material or device with a controlled reversibly variable transmission of solar radiation. Its transmission may be controlled by temperature, electrical current of voltage, or mechanical action, for example. It blocks solar radiation either by reflecting or absorbing it.

A "low emissivity layer" is a material which emits less than 25% of room temperature thermal radiation in the wavelength range of 3 to 40 microns. It may be transparent and composed, for example, of a thin silver layer which is antireflected by two dielectric layers on each side, or of a layer of indium/tin oxide. It may be absorbing of solar radiation and composed, for example, of a layer of nickel suboxide on top of a layer of aluminum. A "convection baffle" is a layer of material, such as a 0.001 inch thick polyethylene film, which absorbs less than 25% of thermal radiation between 3 and 40 microns wavelength.

"Specular transmission" is transmission without scattering; that is reflection where the radiation does not change its direction of travel.

"Specular reflection" is reflection without scattering; that is reflection where the radiation's direction of travel has equal angles of incidence and reflection to the surface in question, as with a mirror.

"Located for other purposes" means that the objects in question would be there anyhow, for reasons other than heat storage. Thus, for example, a sheetrock or plasterboard wall or ceiling surface, or a cement floor, or furniture all store heat well, but are normally placed inside a building without regard to their ability to store heat.

"Within the insulation envelope of a building" means anything interior to or contained within the opaque and transparent insulation of a building and the ground it is built on. Thus, for example, a brick wall forming the outside surface finish of a building would not be included within the insulation envelope of a building, nor would an exterior transparent glazing of a skylight.

An "interior finish" is, for example, a layer of wallpaper, plaster, or wood which gives the interior of a building a pleasing appearance, and/or is easy to clean.

A "solar still" is a device which uses solar radiation to purify water by evaporating it and then condensing it and collecting the condensate.

Of course, it should be understood that a wide range of changes and modifications can be made to the preferred embodiments described above. It is therefore intended that the foregoing detailed description be regarded as illustrative rather than limiting and that it be understood that it is the following claims, including all equivalents, which are intended to define the scope of this invention.

I claim:

1. A solar heated building having a roof, with more than half of the area of said roof comprising a solar collector, said solar collector comprising therein a sequence of layers from the top, that is, above, to the bottom, that is, below, including:

a layer of transparent glazing;

a layer of transparent insulation having a top and a bottom side and having a thermal conductivity of less than 0.25 BTU/sq. ft/°F./hr, and with a solar energy transmission of greater than 40%; and a layer of optical shutter material with no liquid or gas moving fluid and no macroscopic moving parts, having a transmissive and a non-transmissive state, and located on one of said sides of said transparent insulation layer;

wherein said optical shutter allows solar energy transmission three or more times greater in its transmissive state than in its non-transmissive state.

2. A building as in claim 1, comprising an additional solar radiation absorbing layer located below both said insulation and said optical shutter, said absorbing layer having a solar energy absorptivity of greater than 70%.

3. A building as in claim 2, where a layer of interior finish is below and in proximity to said absorbing layer.

4. A building as in claim 1, comprising additional heat storage elements located below both said insulation and said optical shutter, said storage elements having a thermal capacity of greater than 2 BTU/sq.ft/°F./hr.

5. A building as in claim 4, comprising an additional solar radiation absorbing layer located adjacent to said storage layer, said absorbing layer having a solar energy absorptivity of greater than 70%.

6. A building as in claim 5, where a layer of interior finish is below and in proximity to said heat storage element and said absorbing layer.

7. A building as in claim 4, where part of said heat storage elements is a layer below and in proximity to said layers of transparent insulation and optical shutter.

8. A building as in claim 7, where part of said heat storage layer is water.

9. A building as in claim 7, where part of said heat storage layer is a phase change material.

10. A building as in claim 4, where part of said heat storage layer is contained in a floor below said roof.

11. A building as in claim 4, where heat is transported from part of said heat storage elements to part of said building's interior by means of air circulated by fans through ducts.

12. A building as in claim 11, where, for the purpose of not transporting humidity along with said transported heat:

an air to air heat exchanger is interposed between said heat storage element and part of said building's interior;

and separate fans drive the air circulation loops on either side of said heat exchanger.

13. A building as in claim 1, where said optical shutter:

becomes substantially non-transmissive primarily by reflecting solar radiation;

and is located below said transparent insulation.

14. A building as in claim 1, where said optical shutter:

becomes substantially non-transmissive primarily by absorbing solar radiation; and is located above said transparent insulation.

15. A building as in claim 1, where said optical shutter becomes substantially non-transmissive to solar radiation above a preselected temperature and becomes substantially transparent to solar radiation below a preselected temperature.

16. A building as in claim 1, where said optical shutter becomes substantially reversibly non-transmissive to solar radiation in response to an applied voltage or current.

17. A building as in claim 1, where said transparent insulation includes one or more low emissivity layers.

18. A building as in claim 1, where said transparent insulation includes one or more low emissivity layers and one or more convection baffles which are substantially transparent to both solar and thermal radiation.

19. A building as in claim 1, where said transparent insulation includes one or more low emissivity layers and one or more layers of vacuum adjacent to said low emissivity layers.

20. A building as in claim 1, where said transparent insulation includes one or more layers of honeycomb material which is:

oriented with its openings approximately perpendicular to the surface of said building's roof or floors;

substantially non-absorbing of solar radiation;

substantially specular in its transmission and reflection of solar radiation;

substantially absorbing of thermal radiation.

21. A building as in claim 1, where said transparent insulation is made from one or more layers of aerogel.

22. A building as in claim 1, where heat is transported from said heat storage elements to parts of said building's interior by means of water circulated by pumps through pipes.

23. A building as in claim 1, with an additional solar still comprised of:

an evaporator of impure water interior to said building from said solar collector;

a condenser and collector of distilled water comprised of:

part of the interior surface of said solar collector, and/or an air to air heat exchanger; and a collection trough.

24. A building as in claim 23, where said evaporator includes plants in a greenhouse.

25. A building as in claim 1, where at least part of said solar collector comprises part of the envelope of a greenhouse attached to said building.

26. A building as in claim 25 where at least part of said greenhouse is at least part of a top story or attic of said building.

* * * * *